United States Patent
Haravu et al.

(10) Patent No.: US 12,039,182 B2
(45) Date of Patent: Jul. 16, 2024

(54) TECHNIQUES FOR CREATING IDENTICAL SNAPSHOTS ON SYSTEMS DURING SYNCHRONOUS REPLICATION

(71) Applicant: Dell Products L.P., Hopkinton, MA (US)

(72) Inventors: Nagasimha G. Haravu, Apex, NC (US); Alan L. Taylor, Cary, NC (US); Girish Sheelvant, Hopkinton, MA (US); Nagapraveen Veeravenkata Seela, Cary, NC (US)

(73) Assignee: Dell Products L.P., Hopkinton, MA (US)

( * ) Notice: Subject to any disclaimer, the term of this patent is extended or adjusted under 35 U.S.C. 154(b) by 31 days.

(21) Appl. No.: 17/725,874

(22) Filed: Apr. 21, 2022

(65) Prior Publication Data

US 2023/0342064 A1     Oct. 26, 2023

(51) Int. Cl.
*G06F 3/06* (2006.01)

(52) U.S. Cl.
CPC ............ *G06F 3/065* (2013.01); *G06F 3/0613* (2013.01); *G06F 3/0665* (2013.01); *G06F 3/0689* (2013.01)

(58) Field of Classification Search
CPC ...... G06F 3/065; G06F 3/0613; G06F 3/0665; G06F 3/0689
See application file for complete search history.

(56) References Cited

U.S. PATENT DOCUMENTS

| | | | |
|---|---|---|---|
| 9,264,493 B2* | 2/2016 | Clayton | G06F 3/067 |
| 2010/0049930 A1* | 2/2010 | Pershin | G06F 11/1448 |
| | | | 711/E12.103 |
| 2017/0185323 A1* | 6/2017 | Kaushik | G06F 11/1451 |
| 2020/0133499 A1* | 4/2020 | Vokaliga | G06F 3/065 |
| 2020/0349029 A1* | 11/2020 | Meadowcroft | G06F 11/1466 |

\* cited by examiner

*Primary Examiner* — Eric Cardwell
(74) *Attorney, Agent, or Firm* — Muirhead and Saturnelli, LLC

(57) ABSTRACT

Techniques for creating identical snapshots can include: performing synchronous replication between a first storage object of a first system and a second storage object of a second system; enabling change tracking for the first storage object that records in a log which portions of the first storage object are written or modified; responsive to enabling change tracking, creating a snapshot S2 of the second storage object of the second system; responsive to creating the snapshot S2 of the second storage object; creating a snapshot S1 of the first storage object of the first system; responsive to creating the snapshot S1 of the first storage object, disabling change tracking for the first storage object; and copying written or modified content of the first storage object as identified in the log to the snapshot S2 of the second storage object of the second system.

18 Claims, 10 Drawing Sheets

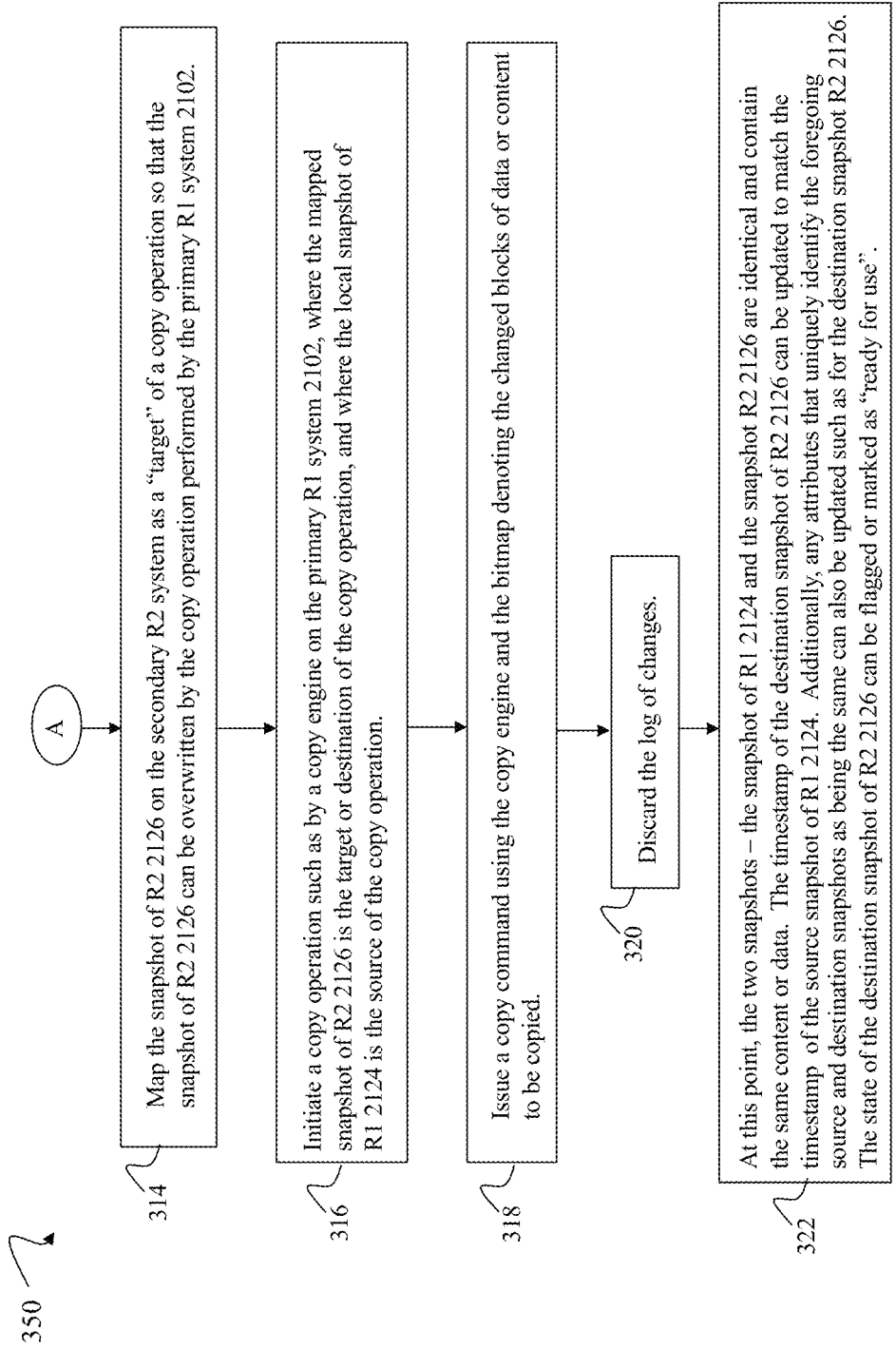

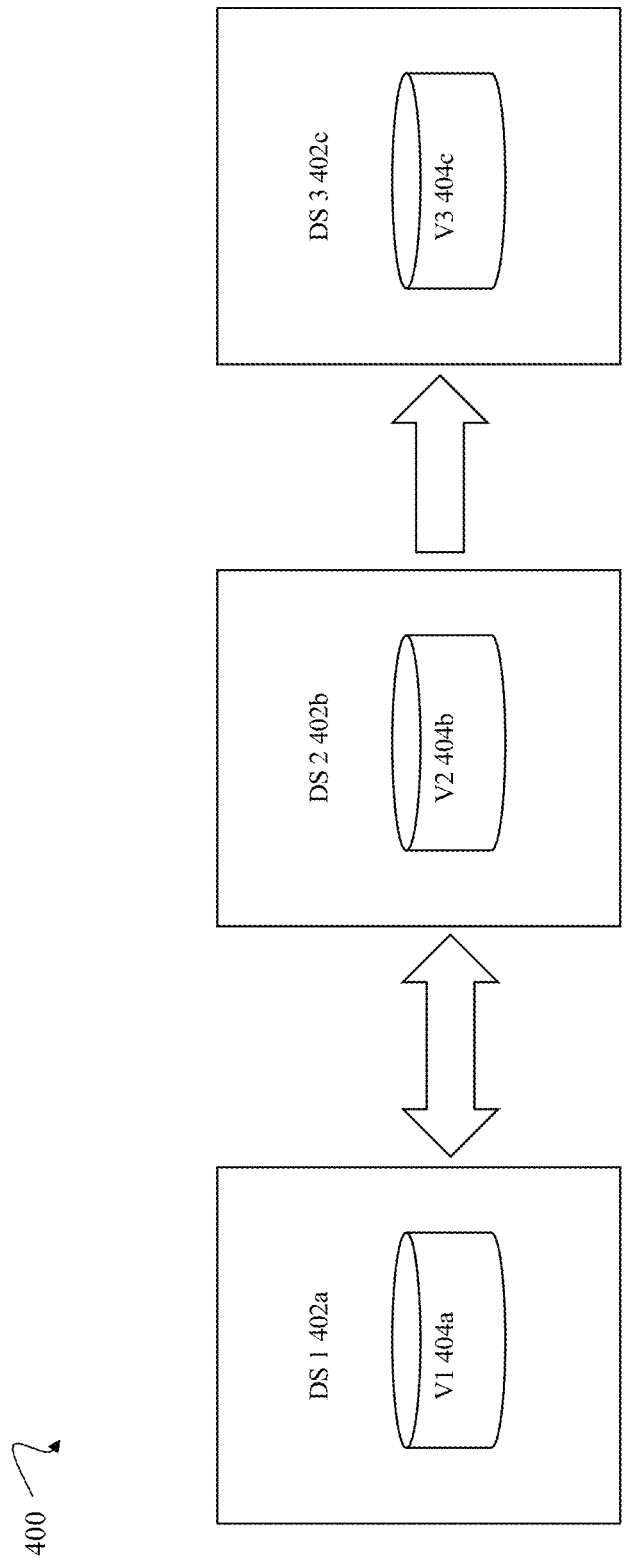

TECHNIQUES FOR CREATING IDENTICAL SNAPSHOTS ON SYSTEMS DURING SYNCHRONOUS REPLICATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium for creating identical snapshots comprising: performing synchronous replication between a first storage object of a first system and a second storage object of a second system, wherein said synchronous replication includes replicating writes, which are directed to the first storage object and which are received at the first system, from the first system to the second system for application to the second storage object of the second system; enabling change tracking for the first storage object of the first system, wherein said change tracking, while enabled for the first storage object, records in a log which portions of the first storage object are written or modified; responsive to said enabling, creating a snapshot S2 of the second storage object of the second system; responsive to said creating the snapshot S2 of the second storage object of the second system; creating a snapshot S1 of the first storage object of the first system; responsive to said creating the snapshot S1 of the first storage object of the first system, disabling said change tracking for the first storage object of the first system; and copying written or modified content of the first storage object as identified in the log to the snapshot S2 of the second storage object of the second system.

In at least one embodiment, processing can include updating one or more attributes of the snapshot S2 of the second storage object to match one or more corresponding attributes of the snapshot S1 of the first storage object. The one or more attributes can include a timestamp and said updating can include updating the timestamp of the snapshot S2 of the second storage object to match a corresponding timestamp of the snapshot S1 of the first storage object. The one or more attributes can include a snapshot signature and said updating can include updating the snapshot signature of the snapshot S2 of the second storage object to match a corresponding snapshot signature of the snapshot S1 of the first storage object.

In at least one embodiment, each of the first storage object and the second storage object can be a logical device or a volume.

In at least one embodiment, each of the first object and the second object can be a consistency group of a plurality of logical devices or volumes.

In at least one embodiment, each of the first storage object and the second storage object can include one or more file-based entities. The one or more file-based entities can include any of a file system and a file.

In at least one embodiment, the first storage object and the second storage object can be configured for one-way synchronous remote replication where writes to the first storage object of the first system can be automatically replicated to the second storage object of the second system.

In at least one embodiment, the first storage object and the second storage object can be configured for bi-directional synchronous remote replication where writes to the first storage object of the first system can be automatically replicated to the second storage object of the second system, and where writes to the second storage object of the second system can be automatically replicated to the first storage object of the first system.

In at least one embodiment, the first storage object and the second storage object can be configured as a same storage object each having a same identity so that a host connected to the first system and the second system can view the first storage object and the second storage object as the same storage object having the same identity. The host can be connected to the first system over a first connection and the host can be connected to the second system over a second connection. The host can issue first writes directed to the same storage object over the first connection and the host can issue second writes directed to the same storage object over the second connection. The first storage object can be a first volume and the second storage object can be a second volume, and wherein the first volume and the second volume can configured as a same logical device. Processing can include: receiving, at the first system, the first writes directed to first logical addresses of the same logical device; storing the first data at the first logical addresses of the first volume configured as the same logical device on the first system; replicating the first data from the first system to the second system; and storing the first data at the first logical addresses of the second volume configured as the same logical device on the second system. Processing can also include: receiving, at the second system, the second writes to second logical address of the same logical device; storing the second data at the second logical addresses of the second volume configured as the same logical device on the second system; replicating the second data from the second system to the first system; and storing the second data at the second logical addresses of the first volume configured as the same logical device on the first system.

In at least one embodiment, processing can include creating a bitmap in accordance with the log of changes made to the first volume. The bitmap can include a bit position corresponding to each logical block address of the first volume. The bit position for a corresponding logical block address can be 1 if the log indicates the corresponding logical block address includes content which has been written or modified, and wherein the bit position for the corresponding logical block address otherwise can be 0. Copying written or modified content of the first storage object as identified in the log to the snapshot S2 of the second storage object of the second system can use the bitmap to identify logical block addresses of the first volume containing written or modified content which is to be copied by said copying to the snapshot S2 of the second storage object of the second system.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 6A and 6B are flowcharts of processing steps that can be performed in at least one embodiment in accordance with the techniques of the present disclosure.

FIG. 8 is one example topology of systems and storage objects in at least one embodiment in accordance with the techniques of the present disclosure.

DETAILED DESCRIPTION OF EMBODIMENT(S)

Figure 1:
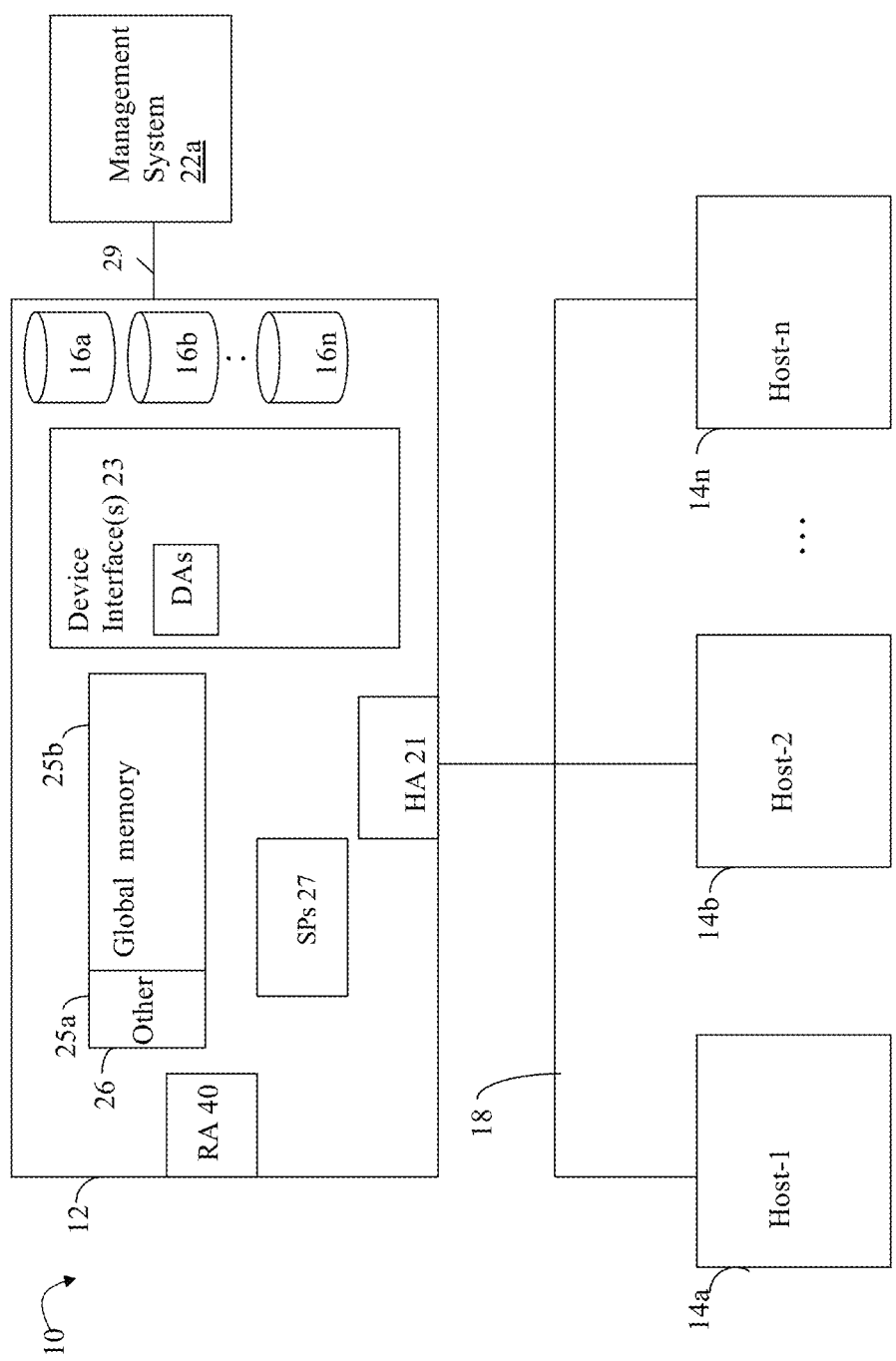
FIG. 1 is an example of components included in a system in accordance with the techniques of the present disclosure.

Applications can consume storage of one or more storage objects, such as logical devices or volumes, which can be further logically grouped together as a consistency group (CG). When a snapshot of an application's data included in a CG needs to be taken, writes across all member logical devices or volumes of the CG can be temporarily quiesced, any outstanding writes can be flushed to the cache, and a snapshot can be independently taken across all volumes, before the writes to the members of the CG are unquiesced or resumed. In one aspect, the CG can also be characterized as a storage object which can itself include one or more other storage objects, such as one or more logical devices or volumes.

Asynchronous replication is one type of remote replication where writes to a source storage object on a source system can be replicated to a counterpart remote storage object on a destination system. In at least one existing implementation, snapshots of storage objects can be provided to the destination system for use as a disaster recovery (DR) site as part of asynchronous replication. In at least one existing implementation, asynchronous replication can be performed using a snapshot-based mechanism wherein internal snapshots are periodically created on the source system, changes between the current and previous snapshot are identified, and only those changes are provided to the replica remote storage object on the DR site. A sync (synchronization) cycle can refer to performing the foregoing processing between two successive replication related snapshots for a single time. The most recent internal snapshot can be maintained on both the source and destination systems and can serve as a common base snapshot in the event the replication needs to be reversed in direction, for example, in the case where there is a failover from the source system to use the destination system as the DR site, and later where there is a fail back from the destination system to the source system. Additionally, a snapshot can also be created as a result of a non-replication related snapshot request, such as in connection with an on-demand request or a periodic replication schedule for a snapshot by a user. If such a non-replication related snapshot is created between two replication sync cycles, the latter sync cycle can be further partitioned into two sync cycles, where the first cycle transfers the user created snapshot and the second cycle transfer the internal snapshot. In these scenarios, the snapshots—both user-created or non-replicated related, and internal or replication related—can be identical across the source and destination systems.

While asynchronous replication can result in some data loss during a disaster of the source system, synchronous (sync) replication can provide zero data loss by mirroring all writes to a remote destination system. With synchronous replication, writes for a storage object arrive at the primary or source system and are mirrored to a counterpart remote storage object of a secondary destination system. In some instances, storage objects on a first system and a second system can be configured for active-active bidirectional synchronous remote replication (sometimes also referred to as a metro configuration). With the metro configuration, writes to the storage object can arrive at the first system and writes to the counterpart remote storage object can arrive at the second system where any such writes to one of the objects received at one of the two systems can be replicated to the other objects of the other remaining system.

When identical snapshots of a storage object and its remote counterpart object need to be taken in connection with synchronous remote replication, I/Os to both storage objects can be paused on both systems, all outstanding writes to both storage objects can be drained or flushed to the caches on both systems, and then the snapshot can be taken across both systems. Synchronizing the foregoing operation or process across the two systems may result in a longer than acceptable I/O latency for an application issuing I/Os to the affected storage object and its remote counterpart object.

In at least one existing arrangement, snapshots can be provided wherein a first snapshot of the storage object on the first system and a second snapshot of its corresponding remote counterpart storage object on the second system can be taken independently across the two systems. The two snapshots may not be identical and can be characterized as "nearly identical" but can have a small amount of potential data difference since the time lag between when the two snapshots are taken can be small. Since the writes, or more generally I/Os, can be momentarily held independently on the two systems, the latency impact can be minimal. However, since the two snapshots taken on the two systems are not identical, the two snapshots do not satisfy criteria or requirements for certain use cases which need a common or identical base snapshot of the storage object and its remote counterpart. One such use case where a common or identical base snapshot of the storage object and its remote counterpart object are utilized can be, for example, for further asynchronous replication to yet a third system or site while also performing synchronous replication of the storage object of the first system and its remote counterpart object of the second system. Another such use case where a common or identical base snapshot of the storage object and its remote counterpart object are utilized can be, for example, for further asynchronous replication to yet a third system or site while also performing bidirectional synchronous replication in a metro configuration of the storage object of the first system and its remote counterpart object of the second system.

Described in the following paragraphs are techniques of the present disclosure that can be used to provide identical snapshots of a storage object of a first system and its remote counterpart storage object of a second system during synchronous replication. In at least one embodiment, the storage object and its remote counterpart storage object can be configured for one-way synchronous replication such as where writes to the storage object are synchronously replicated to the remote counterpart storage object on the second system. In at least one such embodiment having an active-passive configuration, one or more hosts or storage client can issue I/Os including writes to only the first system, and thus directly to the storage object, but not to the second system, and thus not directly to the remote counterpart storage object.

In at least one embodiment, the storage object and its remote counterpart storage object can be included in an active-active bidirectional synchronous replication or metro configuration. In at least one such embodiment, writes to the storage object received at the first system can be synchronously replicated to the remote counterpart storage object on the second system, and writes to the remote storage object received at the second system can be synchronously replicated to the storage object on the first system. In at least one such embodiment having an active-active configuration, one or more hosts or storage client can issue I/Os including writes to the first system, and thus directly to the storage object, and also to the second system, and thus directly to the remote counterpart storage object.

In at least one embodiment, the identical snapshots can be created and provided in an efficient manner while the synchronous replication or synchronous bidirectional replication of writes are performed with respect to both the storage object and its remote counterpart object. In at least one embodiment, both the storage object and its remote counterpart object can be configured so that they are both represented to, and identified by, storage clients as the same storage object. In at least one embodiment, a host and application executing on the host can access the storage object and its remote counterpart object in an active-active bidirectional synchronous replication or metro configuration. In such an embodiment, the storage object and its remote counterpart object can be viewed by the host and its application as the same storage object presented to the host as having the same identity and associated characteristics. In this manner, a host can issue first I/Os including writes to the storage object of the first system over a first connection or path between the host and first system, and the host can issue second I/Os including writes to the remote counterpart storage object of the second system over a different second connection or path between the host and second system. In such a configuration from the point of view of the host, the host issues the first I/Os and the second I/Os to the same storage object having a particular identity, respectively, over the first path and the second path. In such an embodiment, the same storage object having the particular identity can be configured from the storage object of the first system and the remote counterpart object of the second system, where the storage object and its remote counterpart object are presented to the host as having the same particular identity and characteristics. In at least one embodiment of the techniques of the present disclosure, identical snapshots of the storage object of the first system and its remote counterpart object of the second system can be provided by independently obtaining separate snapshots of the storage object and its remote counterpart object. Processing can then modify one of the two snapshots taken to make it identical to the second remaining snapshot. In at least one embodiment, the processing can modify the earlier (snapshot taken earlier in time) of the two snapshots to make it identical to the later (snapshot taken later in time) of the two snapshots.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
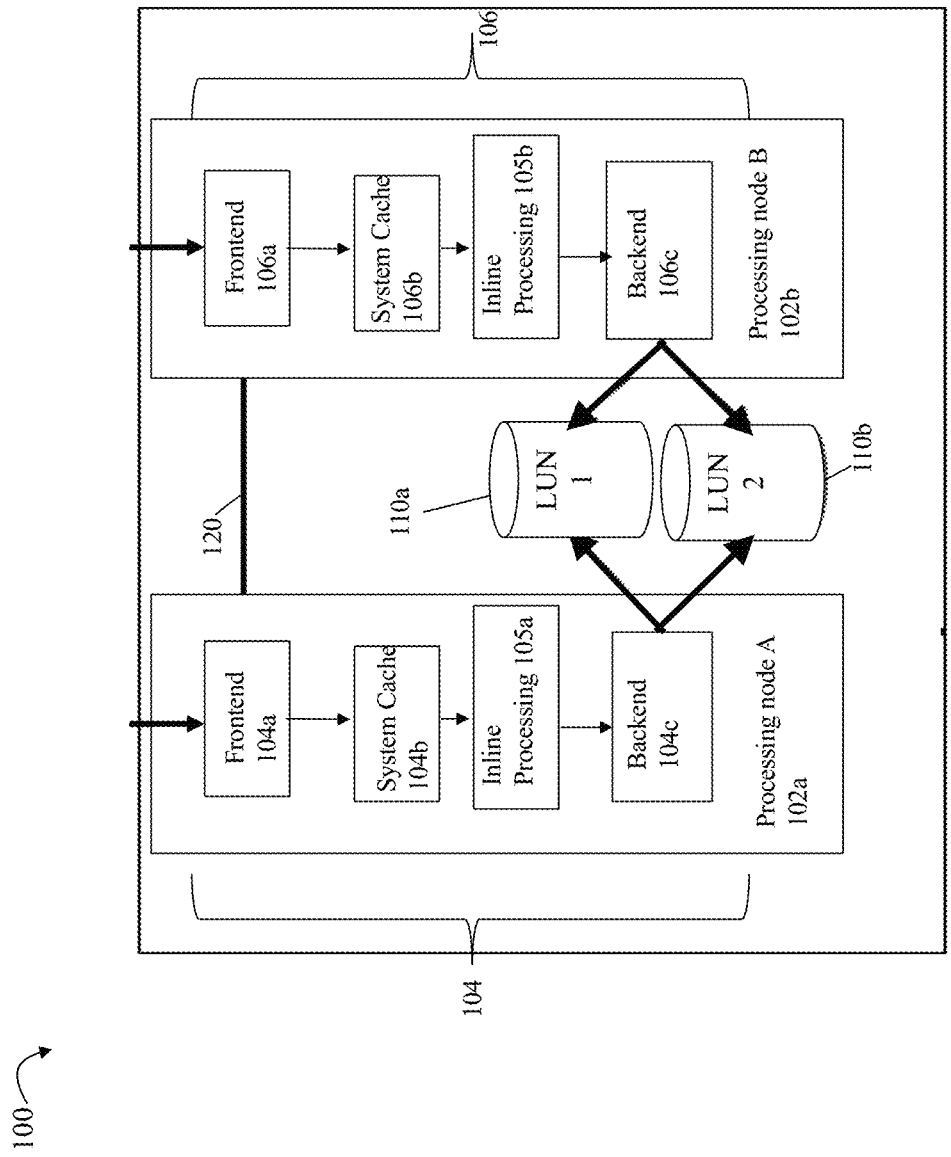
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 100, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and BE component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache (e.g., cache hit or read cache hit), the read data block is retrieved from the system cache 104b and returned to the host. Otherwise, if the requested read data block is not in the system cache 104b (e.g., cache miss or read cache miss) but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with discussion above, applications can consume storage of one or more storage objects, such as logical devices or volumes, which can be further logically grouped together as a consistency group (CG). When a snapshot of an application's data included in a CG needs to be taken, writes across all member logical devices or volumes of the CG can be temporarily quiesced, any outstanding writes can be flushed to the cache, and a snapshot can be independently taken across all volumes, before the writes to the members of the CG are unquiesced or resumed. In one aspect, the CG can also be characterized as a storage object which can itself include one or more other storage objects, such as one or more logical devices or volumes.

Asynchronous replication is one type of remote replication where writes to a source storage object on a source system can be replicated to a counterpart remote storage object on a destination system. In at least one existing implementation, snapshots of storage objects can be provided to the destination system for use as a DR site as part of asynchronous replication. In at least one existing implementation, asynchronous replication can be performed using a snapshot-based mechanism wherein internal snapshots are periodically created on the source system, changes between the current and previous snapshot are identified, and only those changes are provided to the replica remote storage object on the DR site. A sync (synchronization) cycle can refer to performing the foregoing processing between two successive replication related snapshots for a single time. The most recent internal snapshot can be maintained on both the source and destination systems and can serve as a common base snapshot in the event the replication needs to be reversed in direction, for example, in the case where there is a failover from the source system to use the destination system as the DR site, and later where there is a fail back from the destination system to the source system. Additionally, a snapshot can also be created as a result of a non-replication related snapshot request, such as in connection with an on-demand request for a snapshot by a user. If such a non-replication related snapshot is created between two replication sync cycles, the latter sync cycle can be further partitioned into two sync cycles, where the first cycle transfers the user created snapshot and the second cycle transfer the internal snapshot. In these scenarios, the snapshots—both user-created or non-replicated related, and internal or replication related—can be identical across the source and destination systems.

While asynchronous replication can result in some data loss during a disaster of the source system, synchronous (sync) replication can provide zero data loss by mirroring all writes to a remote destination system. With synchronous replication, writes for a storage object arrive at the primary or source system and are mirrored to a counterpart remote storage object of a secondary destination system. In some instances, storage objects on a first system and a second system can be configured for active-active bidirectional synchronous remote replication (sometimes also referred to as a metro configuration). With the metro configuration, writes to the storage object can arrive at the first system and writes to the counterpart remote storage object can arrive at the second system where any such writes to one of the objects received at one of the two systems can be replicated to the other objects of the other remaining system.

When identical snapshots of a storage object and its remote counterpart object need to be taken in connection with synchronous remote replication, I/Os to both storage objects can be paused on both systems, all outstanding writes to both storage objects can be drained and flushed to the caches on both systems, and then the snapshot can be taken across both systems. Synchronizing the foregoing operation or process across the two systems may result in a longer than acceptable I/O latency for an application issuing I/Os to the affected storage object and its remote counterpart object. It should be noted that the I/O latency in connection with the foregoing (e.g., when synchronizing across the two systems to obtain identical snapshots) can be further increased in a metro configuration or an active-active bidirectional synchronous replication configuration as compared to a one way synchronous replication configuration.

In at least one existing arrangement, snapshots can be provided wherein a first snapshot of the storage object on the first system and a second snapshot of its corresponding remote counterpart storage object on the second system can be taken independently across the two systems. The two snapshots may not be identical and can be characterized as "nearly identical" but can have a small amount of potential data difference since the time lag between when the two snapshots are taken can be small. Since the writes, or more generally I/Os, can be momentarily held independently on the two systems, the latency impact can be minimal. However, since the two snapshots taken on the two systems are not identical, the two snapshots do not satisfy criteria or requirements for certain use cases which need a common or identical base snapshot of the storage object and its remote counterpart. One such use case where a common or identical base snapshot of the storage object and its remote counterpart object are utilized can be, for example, for further asynchronous replication to yet a third system or site while also performing bidirectional synchronous replication in a metro configuration of the storage object of the first system and its remote counterpart object of the second system.

Described in the following paragraphs are techniques of the present disclosure that can be used to provide identical snapshots of a storage object of a first system and its remote counterpart storage object of a second system during synchronous replication. In at least one embodiment, the storage object and its remote counterpart storage object can be configured for one-way synchronous replication such as where writes to the storage object are synchronously replicated to the remote counterpart storage object on the second system. In at least one such embodiment having an active-passive configuration, one or more hosts or storage client can issue I/Os including writes to only the first system, and thus directly to the storage object, but not to the second system, and thus not directly to the remote counterpart storage object.

In at least one embodiment, the storage object and its remote counterpart storage object can be included in an active-active bidirectional synchronous replication or metro configuration. In at least one such embodiment, writes to the storage object received at the first system can be synchronously replicated to the remote counterpart storage object on the second system, and writes to the remote storage object received at the second system can be synchronously replicated to the storage object on the first system. In at least one such embodiment having an active-active configuration, one or more hosts or storage client can issue I/Os including writes to the first system, and thus directly to the storage object, and also to the second system, and thus directly to the remote counterpart storage object.

In at least one embodiment, the identical snapshots can be created and provided in an efficient manner while the synchronous replication or synchronous bidirectional replication of writes are performed with respect to both the storage object and its remote counterpart object. In at least one embodiment, both the storage object and its remote counterpart object can be configured so that they are both represented to, and identified by, storage clients as the same storage object. In at least one embodiment, a host and application executing on the host can access the storage object and its remote counterpart object in an active-active bidirectional synchronous replication or metro configuration. In such an embodiment, the storage object and its remote counterpart object can be viewed by the host and its application as the same storage object presented to the host as having the same identity and associated characteristics. In this manner, a host can issue first I/Os including writes to the storage object of the first system over a first connection or path between the host and first system, and the host can issue second I/Os including writes to the remote counterpart storage object of the second system over a different second connection or path between the host and second system. In such a configuration from the point of view of the host, the host issues the first I/Os and the second I/Os to the same storage object having a particular identity, respectively, over the first path and the second path. In such an embodiment, the same storage object having the particular identity can be configured from the storage object of the first system and the remote counterpart object of the second system, where the storage object and its remote counterpart object are presented to the host as having the same particular identity and characteristics. In at least one embodiment of the techniques of the present disclosure, identical snapshots of the storage object of the first system and its remote counterpart object of the second system can be provided by independently obtaining separate snapshots of the storage object and its remote counterpart object. Processing can then modify one of the two snapshots taken to make it identical to the second remaining snapshot. In at least one embodiment, the processing can modify the earlier (snapshot taken earlier in time) of the two snapshots to make it identical to the later (snapshot taken later in time) of the two snapshots.

The foregoing and other aspects of the techniques of the present disclosure are described in more detail in the following paragraphs.

Consistent with discussion above, a data storage system can provide different data replication technologies, facilities or services. Such replication technologies can be characterized as local or remote. Additionally, a replication technology can provide for creating a complete, physical bit for bit copy of data (that is local and/or remote). A replication technology can additionally or alternatively provide for creating a logical or virtual point in time copy of a data source such as using a snapshot technology or facility known in the art. Such logical copies of a data source are not a complete physical copy of the data source. Rather, different techniques such as a snapshot technique can be used to create a logical or virtual copy of the data source. For example, a snapshot facility can be used to create a snapshot characterized as a logical point in time copy of data. In connection with a logical device, or more generally any storage object or entity, software of a data storage system can provide one or more data replication services or facilities whereby a snapshot is one such facility that can be used to create point in time snapshot of a logical device such as a LUN for non-disruptive backup. A snapshot can appear like a normal logical device and can be used for backup, testing, and the like. The snapshot facility can be characterized as a local replication facility or service that takes snapshots of storage objects in a single data storage system. A local replication facility can be contrasted with a remote replication facility that provides for remote replication of storage objects from a source site or data storage system to a remote site or data storage system. Remote replication facilities provide remote copies of the storage objects for use in connection with data unavailability or disaster of the source site.

Snapshots can rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device can be contrasted, for example, with the physically complete bit-for-bit replicas of the source logical device.

In connection with the foregoing, COFW is only one example of a technology or a technique that can be used in connection with snapshots. More generally, any suitable technique can be used in connection with snapshot creation and techniques described herein. As another example, redirect on Write (ROW) is another technique that can be used in connection with a snapshot implementation. With ROW, after a snapshot is taken, new writes to the primary or source logical device are redirected (written) to a new location.

In some instances, write consistency and dependency can be preserved with respect to a CG identifying a group of storage resources or objects, such as two or more LUNs, which operate in unison to preserve the integrity and dependent write consistency of data distributed across all LUNs of the CG. Thus, write consistency can be maintained across and with respect to all LUNs (or more generally all resources or objects) of a CG whereby, for example, all members of the CG denote a copy of data with respect to a same point in time. In at least one embodiment, a CG can be a set of LUNs which are replicated together for which write order fidelity is preserved. A CG can be used, for example, in connection with a write transaction that performs multiple writes to two or more LUNs of the same CG. It can be required for certain applications, such as a database application, which issues the multiple writes of the write transaction to two or more LUNs for all such multiple writes of the single write transaction to be applied atomically across the two or more LUNs of the CG. In this manner from the client application view point, the content of the LUNs of the CG need to reflect application of all writes of the entire write transaction, or otherwise have content in which none of the writes of the write transaction are applied to the LUNs of the CG. In connection with a snapshot taken at a point in time, a single snapshot can include all writes of the single write transaction in order to reflect and maintain the write consistency of the write transaction across the two or more LUNs of the CG. In at least one embodiment, the multiple writes of the single transaction to multiple LUNs of the CG can be included in the same single snapshot taken of each of the LUNs of the CG.

When a snapshot needs to be taken of a storage object, new writes, or more generally, new I/Os, to the storage object can be temporarily paused or quiesced and pending writes, or more generally pending I/Os, directed to the storage object can be drained. In particular, the new writes or other I/Os received can be placed in a queue or buffer. The pending I/Os including pending write can be allowed to complete. In particular in at least one embodiment, pending writes can be characterized as drained or complete (where a response or acknowledgement regarding write completion can be returned to the host or other client which originated the write) when the write data for the pending writes has been stored in the cache. Once all pending I/Os including writes directed to the storage object have been drained whereby the write data of the pending writes has been stored in the cache, the snapshot of the storage object can be created or taken. Subsequent to creating or taking the snapshot of the storage object, I/Os directed to the storage object can be unquiesced and restarted whereby servicing I/Os directed to the storage object resumes. In response to unquiescing and resuming or restarting the I/Os directed to the storage object, any previously queued I/Os for the storage object can be removed from the queue and serviced or processed. Additionally, new I/Os directed to the storage object which are received subsequent to the restarting or unquiescing can also be serviced.

A data storage system can also provide a remote replication facility that automatically replicates a storage object or entity of a first or source data storage system to a second or remote data storage system. Such remote replication can be performed in an ongoing continuous manner with respect to changes made over time to the storage object of the source system. Consistent with other discussion herein, the storage object of a replication service or facility, both local and remote, can be, for example, a logical device or LUN, a file, file system, a virtual volume (VVOL) used by a VM of a virtualized environment, and the like. A remote replication facility can automatically mirror or replicate all writes performed to the source storage object on the first system to a duplicate target storage object on the remote second data storage system. In connection with source and target storage objects that are logical devices, the source and target logical devices can be configured to have the same identity (from the perspective and use of the host or other storage client), as well as the same size or capacity as well as have other matching characteristics in order to have the target logical device be identified to the host as the same logical device as the source logical device. In this manner, the target logical device on the second or target data storage system can be used in the event of data unavailability or a disaster at the first data storage system. Generally, each logical device of the source system can be similarly configured for replication on the target system.

In at least one embodiment, the remote replication facility can provide one or more supported replication modes such as asynchronous remote replication and synchronous remote replication. With remote replication, the source system can receive a write to a source storage object configured to have a corresponding target storage object on the remote or target system. The write data can be stored on the source system, such as recorded in the cache, and then later destaged or written out, such as from the cache, to a physical location on the backend PDs of the source system provisioned for the source storage object. With asynchronous remote replication, an acknowledgement regarding completion of the write I/O operation can be returned to the host or other client that originated the write I/O operation once the write data of the write I/O operation has been stored in the cache of the source system. With synchronous remote replication, an acknowledgement is not returned to the host or other client that originated the write I/O operation until the target system has acknowledged receipt of the replicated write I/O operation on the target system. With remote replication, the write data is transferred from the source system to the remote target system for replication on the target storage object. Responsive to receiving the write data transferred from the source system to the remote target system, the write data can be stored in the cache of the target system. At a later point in time, the write data can destaged or written out from the cache of the target system to a physical location on the BE PDs of the target system provisioned for the target storage object. The target system can send an acknowledgement regarding successful completion of the write I/O operation on the target system once the data written by the write operation has been stored in the cache of the target system. With synchronous replication, the host or other client originating the write I/O operation can be sent an acknowledgement regarding completion of the write I/O operation responsive to the source system receiving the foregoing acknowledgement regarding successful receipt of the replicated write I/O operation from the target system. Asynchronous replication mode can be preferred for longer distances between the source and target systems to minimize time outs occurring on an external host waiting to receive the acknowledgement from the source system regarding completion of the write I/O operation.

In at least one data storage system, remote data replication (also referred to as remote replication) is one technique that can be used in connection with providing for DR of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a the asynchronous and synchronous modes described above.

Figure 3:
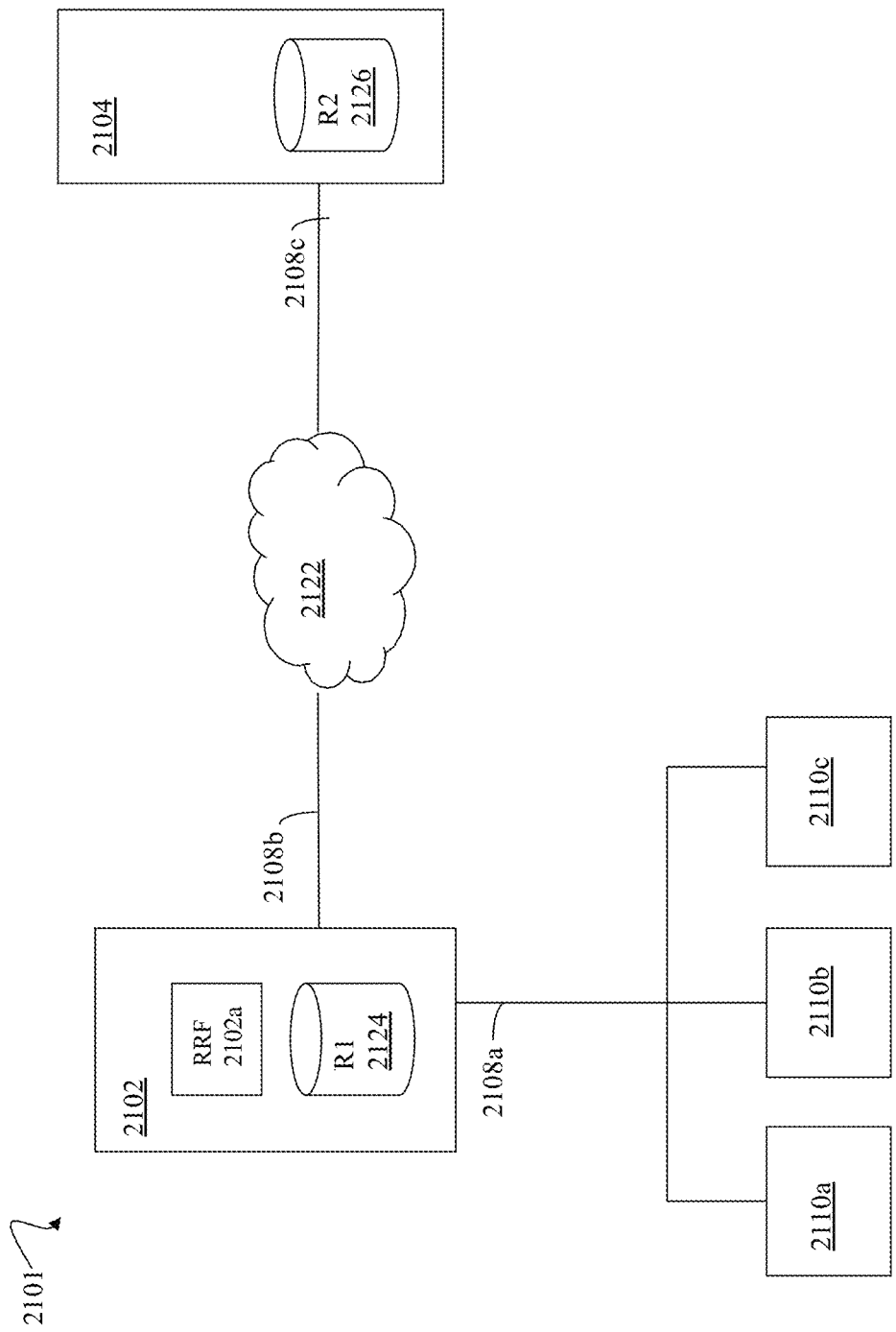
FIG. 3 is an example illustrating a configuration of systems in connection with performing remote replication in at least one embodiment in accordance with the techniques of the present disclosure.

Referring to FIG. 3, shown is an example 2101 illustrating remote data replication and an associated configuration in at least one embodiment in accordance with the techniques of the present disclosure. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can perform operations to the data storage system 2102 over the connection 2108a. The hosts 2110a, 2110b and 2110c may be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 104 can be characterized as remote with respect to the hosts 2110a, 2110b and 2110c.

The host 1210a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF) 2102a. In operation, the host 110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

The R1 and R2 devices can be configured as LUNs. For example, R1 and R2 can be configured to have the same LUN identity from the perspective of the hosts 2110a-c. For example, R1 can be the primary copy of a LUN, such as LUN A, for which a backup copy is made using remote replication to the R2 device, also configured as the same LUN A. In the event of a disaster where R1 is destroyed or unavailable and the hosts have to continue issuing I/Os using the R2 device, the hosts can continue issuing I/Os to the same LUN A using R2.

The RRF 2102a can be configured to operate in one or more different supported replication modes such as, for example, the synchronous mode and the asynchronous mode, as discussed above. Consistent with other discussion herein, when operating in the synchronous mode, the host does not consider a write I/O operation to be complete until the write I/O has been completed on both the first and second data storage systems. Thus, in the synchronous mode, the first or source storage system 2102 will not provide an indication to the host that the write operation is committed or complete until the first storage system 2102 receives an acknowledgement from the second remote or target data storage system 2104 regarding receipt of the replicated write by the second data storage system. In contrast, in connection with the asynchronous mode, the host receives an acknowledgement from the first data storage system 2102 as soon as the information is stored, such as in the cache and log, on the first data storage system 2102 without waiting for the acknowledgement of the replicated write from the second data storage system 2104.

With synchronous mode remote data replication, a host 2110a can issue a write to the R1 device 2124. The primary, source or R1 data storage system 2102 may record the write data in the cache of the source system 2102. The RRF operating in the synchronous mode can replicate or propagate the write data (along with other information such as the logical address where the write data is stored) across an established connection or link (more generally referred to as the remote replication link or link) such as over 2108b, 2122, and 2108c, to the target, secondary or R2 data storage system 2104 where the write data can be stored in the cache of the system 2104. At some subsequent point in time after the write data is stored in the cache of the system 2104, the write data can be applied to the R2 device. Once the write data is stored in the cache of the system 2104, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. With synchronous replication, the R1 device 2124 and the R2 device 2126 are fully mirrored but can result in a high I/O latency and response time (e.g., since the I/O latency and response time includes the time needed to replicate the write data from the source to the target system and also return an acknowledgement from the target to the source system regarding receipt of the write data). Generally, synchronous replication can be performed with a replication link or connection between the systems 2102 and 2104 that is reliable and has a high transmission speed.

With asynchronous replication mode, the R1 system 2102 can return the acknowledgement to the host 2110a regarding completion of the write immediately after the R1 system 2102 has stored the write data in its log and cache. In this manner with asynchronous replication, the R1 system 2102 does not wait for the return acknowledgement from the R2 system 2104 before returning the acknowledgement of write completion to the host 2110a. With asynchronous replication, there is always some time lag and thus a data difference or delta between the R1 device 2124 and the R2 device 2126. With asynchronous replication, the R2 device 2126 of the R2 system 2104 always lags behind the R2 device 2124 of the R1 system 2102 by some portion of the most recent data updates defined by the granularity of the replication.

In at least one embodiment, the R1 device 2124 and R2 device 2126 can be logical devices, such as LUNs, configured to have the same LUN identity to the host or other storage client. The R1 and R2 devices can be, for example, fully provisioned LUNs, such as thick LUNs, or may be LUNs that are thin or virtually provisioned logical devices. More generally, R1 and R2 can represent any suitable corresponding storage objects some of which are described elsewhere herein.

Figure 4:
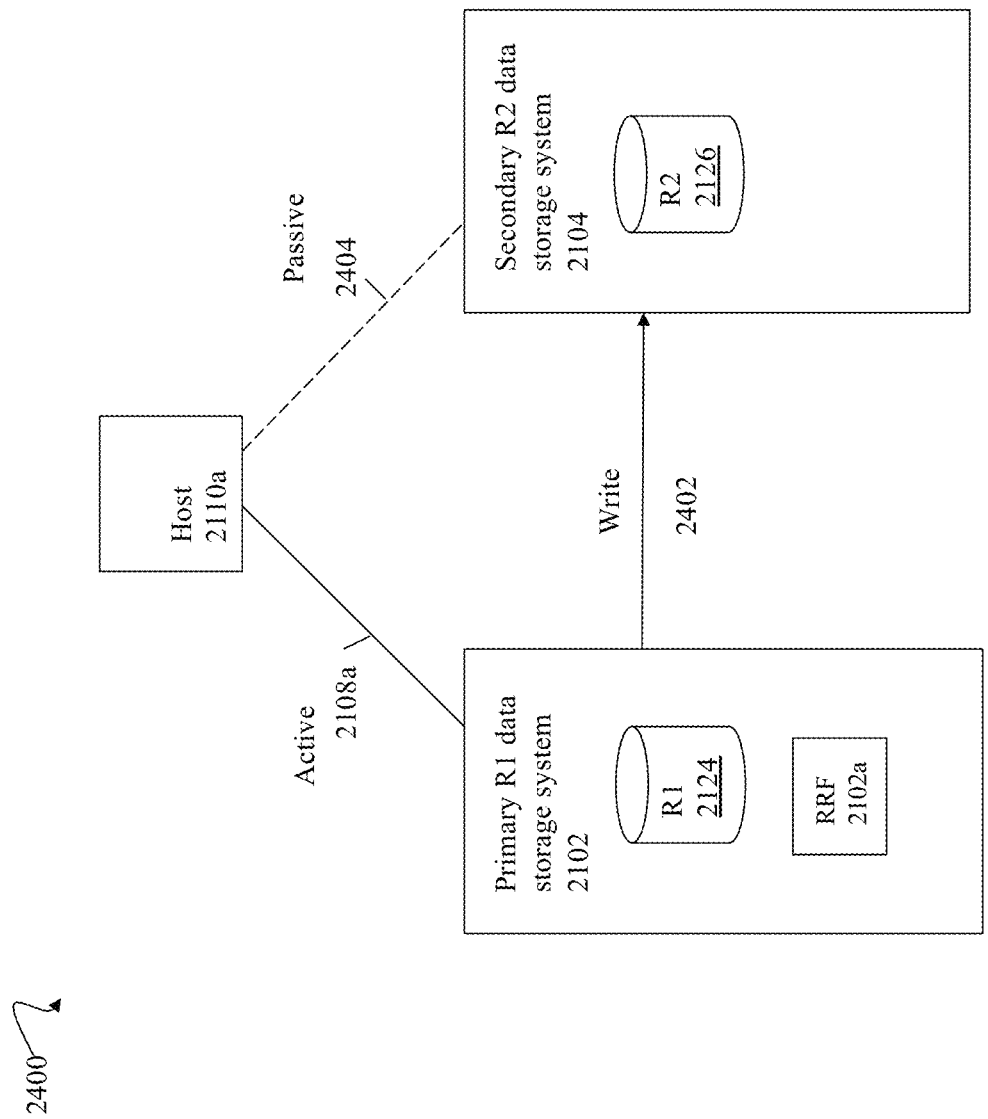
FIG. 4 is an example illustrating systems and storage objects configured for active-passive synchronous remote replication in at least one embodiment in accordance with the techniques of the present disclosure.

With reference to FIG. 4, shown is a further simplified illustration of components that can be used in connection with remote replication and in accordance with the techniques of the present disclosure. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2101 and 2104 for replication. As mentioned above, when operating in synchronous replication mode, host 2110a issues a write, or more generally, all I/Os including reads and writes, over a path to only the primary R1 data storage system 2102. In the example 2400, the host 2110a does not issue I/Os directly to the R2 data storage system 2104. The configuration of FIG. 4 can also be referred to herein as an active-passive configuration such as with synchronous replication and other supported replication modes where the host 2110a has an active connection or path 2108a over which all I/Os are issued to only the R1 data storage system. The host 2110a can have a passive connection or path 2404 to the R2 data storage system 2104.

In the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued). For example, the devices 2124 and 2126 can be configured to have the same logical device identifier such as the same world wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices, volumes, or more generally storage objects, on two different data storage systems to a host as the same single volume or LUN, or more generally, as the same storage object. Thus, from the view of the host 2110a, the same LUN A is exposed over the two paths 2108a and 2404.

It should be noted although only a single replication link 2402 is illustrated, more generally any number of replication links can be used in connection with replicating data from systems 2102 to system 2104.

The example 2400 of FIG. 4 illustrates one way synchronous replication in an active-passive configuration where the R1 device 2124 can be actively accessed so that the host 2110a can issue I/Os directly to R1 2124. In such a configuration, the host 2110a may not directly issue I/Os to the system 2104 and the R2 device 2126. Writes to the R1 device 2124 received at the system 2102 result in indirectly issuing the writes to the R2 device 2126 via the replication of the write data from the system 2102 to the system 2104.

Figure 5:
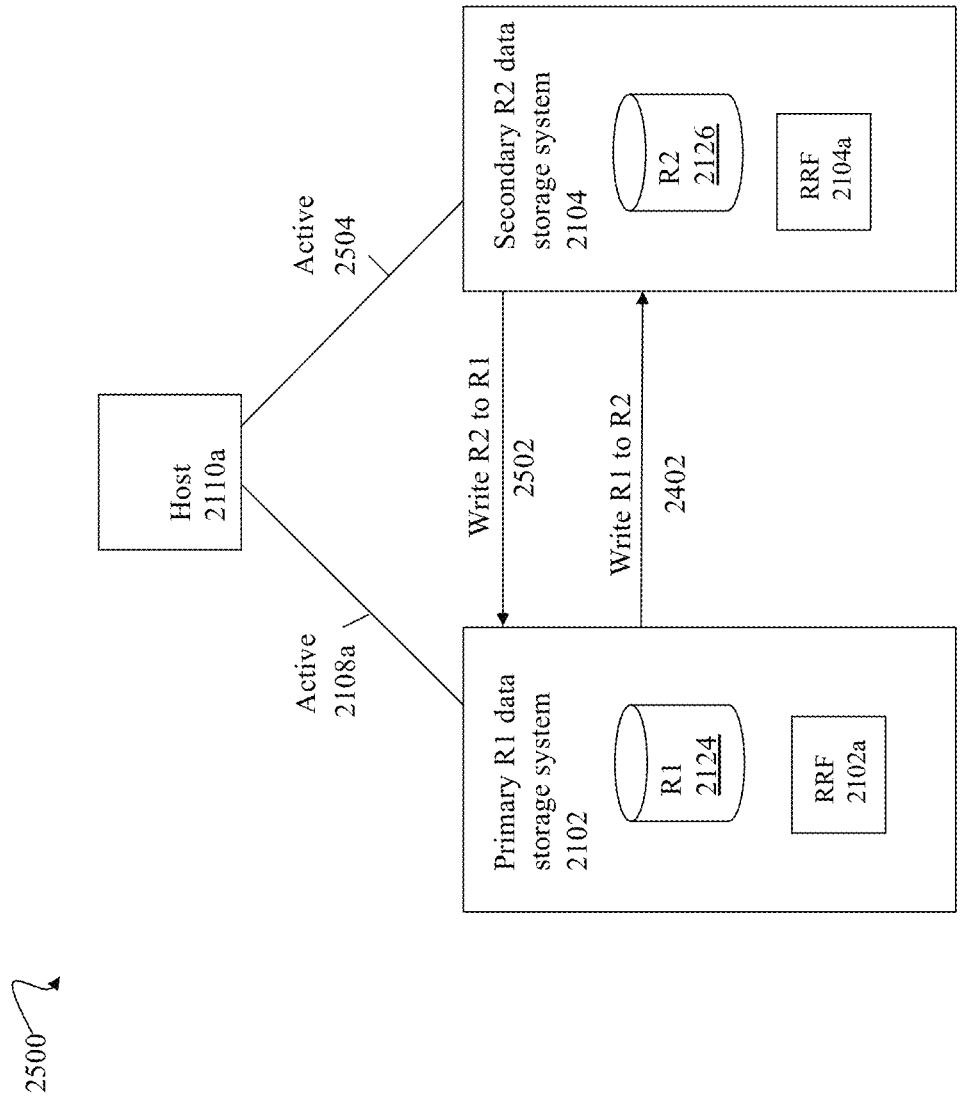
FIG. 5 is an example illustrating systems and storage objects configured for active-active bidirectional synchronous remote replication in at least one embodiment in accordance with the techniques of the present disclosure.

Referring to FIG. 5, shown is another example configuration of components that can be used in at least one embodiment in accordance with the techniques of the present disclosure. The example 2500 illustrates an active-active configuration as can be used in connection with synchronous replication in at least one embodiment. In the active-active configuration with synchronous replication, the host 2110a can have a first active path 2108a to the R1 data storage system and R1 device 2124 configured as LUN A. Additionally, the host 2110a can have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration can issue I/Os, both reads and/or writes, over both of the paths 2108a and 2504 at the same time. The host 2110a can send a first write over the path 2108a which is received by the R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The host 2110a can also send a second write over the path 2504 which is received by the R2 system 2104 and written to the cache of the R2 system 2104 where, at a later point in time, the second write is destaged from the cache of the R2 system 2104 to physical storage provisioned for the R2 device 2126 configured as the LUN A. The R2 system 2104 also sends the second write to the R1 system 2102 over a second link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the R1 system 2102, the R1 system 2102 sends an acknowledgement over the link 2502 to the R2 system 2104 that it has completed the second write. Once the R2 system 2104 receives the acknowledgement from the R1 system (regarding completion of the second write), the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110a unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that although FIG. 5 illustrates for simplicity a single host accessing both the R1 device 2124 and R2 device 2126, any number of hosts can access one or both of the R1 device 2124 and the R2 device 2126.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host 2110a by having each volume or device of the device pair (R1 device 2124, R2 device 2126) configured and presented to the host 2110a as the same volume or LUN A. Additionally, the stretched LUN A is configured for two way synchronous remote replication between the systems 2102 and 2104 respectively including the two devices or volumes of the device pair, (R1 device 2124, R2 device 2126).

In a metro or active-active bidirectional synchronous remote replication configuration, hosts can be configured with uniform host connectivity as illustrated in FIG. 5, where the host 2110a can be connected to both data storage systems 2102 and 2104 exposing the pair of devices or volumes 2124, 2126 configured as the same stretched volume or LUN, such as the LUN A described in connection with FIG. 5. From the perspective of the host 2110a of FIG. 5 in at least one embodiment, the host 2110a identifies the devices or volumes 2124 and 2126 as the same LUN so that, from the perspective of the host 2110a, the host 2110a believes it is issuing I/Os over two different paths 2108a and 2504 to the same LUN.

It should be noted that FIG. 5 illustrates a configuration with only a single host connected to both systems 2102, 2104 of the metro cluster. More generally, a configuration such as illustrated in FIG. 5 can include multiple hosts where one or more of the hosts are connected to both systems 2102, 2104 and/or one or more of the hosts are connected to only a single of the systems 2102, 2104.

As also illustrated in FIG. 5, the system 2102 can include the RRF 2102a and the system 2104 can include the RRF 2104a. Generally, the RRF 2102a can be as described above where, in accordance with the techniques of the present disclosure, the RRD 2102a can facilitate performing synchronous replication for configured storage object pairs, such as R1 2124 and R2 2126 to synchronously replicate writes, which are received at the system 2102 and directed to R1 2124, to R2 2126 on the system 2104. The RRF 2104a can perform processing and operations similar to the RRF 2102a with the difference that the RRF 2104a performs such synchronous remote replication with the system 2104 configured as the source of the replication and the system 2102 as the destination of the replication. Thus, the RRF 2104a can facilitate performing synchronous replication for configured storage object pairs, such as R2 2126 and R1 2124 to synchronously replicate writes, which are received at the system 2104 and directed to R2 2126, to R1 2124 on the system 2102.

In at least one embodiment with reference to FIG. 4, the techniques of the present disclosure can be used to take identical snapshots of the R1 device 2124 and the R2 device 2126 configured for one-way synchronous replication as illustrated in FIG. 4. In at least one such embodiment, the techniques of the present disclosure can be used to create the foregoing two identical snapshots of the R1 device 2124 and the R2 device 2126 while also performing synchronous replication of writes from the R1 device 2124 to the R2 device 2126. In at least one such embodiment, the two identical snapshots can be taken while writes are received at the system 2102 and are issued to the R1 device 2124, where such writes can then be synchronously replicated to the system 2104 and applied to the R2 device 2126.

In at least one embodiment with reference to FIG. 5, the techniques of the present disclosure can be used to take identical snapshots of the R1 device 2124 and the R2 device 2126 configured for bidirectional synchronous remote replication as illustrated in FIG. 5. In at least one such embodiment, the techniques of the present disclosure can be used to create the foregoing two identical snapshots of the R1 device 2124 and the R2 device 2126 while also performing bidirectional synchronous replication of writes between the R1 device 2124 and the R2 device 2126. In at least one such embodiment with reference to FIG. 5, the two identical snapshots can be taken while writes are received at the system 2102 and are issued to the R1 device 2124, where such writes can then be synchronously replicated to the system 2104 and applied to the R2 device 2126. In at least one such embodiment with reference to FIG. 5, the two identical snapshots can be taken while writes are received at the system 2104 and are issued to the R2 device 2126, where such writes can then be synchronously replicated to the system 2102 and applied to the R1 device 2124.

Embodiments of the techniques of the present disclosure can be performed in a configuration such as illustrated, for example, in FIG. 4 for one-way synchronous remote replication and, for example, in FIG. 5 for bidirectional synchronous remote replication. Illustrative examples such as in FIGS. 4 and 5 may be described in the following paragraphs with respect to a single object, such as single source LUN denoted as the R1 device 2124 having a corresponding remote counterpart LUN denoted as the R2 device 2126. More generally, the techniques of the present disclosure can be performed with respect to any suitable storage objects some of which are described herein. For example, in some instances, write consistency and dependency can be preserved with respect to a storage object that is a CG identifying a logically defined group of storage resources or objects, such as two or more LUNs, which operate in unison to preserve the integrity and dependent write consistency of data distributed across all LUNs of the CG. Thus, write consistency can be maintained across and with respect to all LUNs (or more generally all resources or objects) of a CG whereby, for example, all members of the CG denote a copy of data with respect to a same point in time. In at least one embodiment, a CG can be a set of LUNs which are replicated together for which write order fidelity is preserved. In this manner in at least one embodiment, the techniques of the present disclosure can be used in connection with a CG including multiple LUNs.

A CG can be used, for example, in connection with a write transaction that performs multiple writes to two or more LUNs of the same CG. It can be required for certain applications, such as a database application, which issues the multiple writes of the write transaction to two or more LUNs for all such multiple writes of the single write transaction to be applied atomically across the two or more LUNs of the CG. In this manner from the host or client application view point, the content of the LUNs of the CG need to reflect application of all writes of the entire write transaction, or otherwise have content in which none of the writes of the write transaction are applied to the LUNs of the CG. In connection with a snapshot taken at a point in time, a single snapshot can include all writes of the single write transaction in order to reflect and maintain the write consistency of the write transaction across the two or more LUNs of the CG. In at least one embodiment, the multiple writes of the single transaction to multiple LUNs of the CG can be included in the same single snapshot taken of each of the LUNs of the CG. More generally, writes between two successive checkpoints or points in time each associated with a request to take a snapshot can denote writes applied across one or more LUNs to maintain any desired write consistency with respect to the one or more LUNs. For example, at a first point in time T1, a request or command can be issued to create a first snapshot SNAP1 of a CG of LUNs. At a next subsequent point in time T2, a second request or command can be issued to create a second snapshot S1 of the CG of LUNs. Writes between the two successive points in time T1, T2 can denote the writes included in the same snapshot SNAP2. Only writes prior to T1 are included in SNAP1. Writes not within or between the same two successive points in time, or writes that cross point in time boundaries, can denote writes in different snapshots.

In at least one embodiment in response to a snapshot request or command with respect to a CG including multiple LUNs or storage objects generally, a snapshot instance can be created for each LUN or storage object in the CG applying write to LUNs of the CG which are received prior to the point in time of the snapshot request or comment. To further illustrate, consider the example noted above where, at the first point in time T1, a request or command can be issued to create a first snapshot SNAP1 of a CG of LUNs where the CG includes LUN A and LUN B. At the next subsequent point in time T2, a second request or command can be issued to create a second snapshot S1 of the CG of LUNs. In this case, a first snapshot SNAP1 instance can be created for LUN A (Snap1 LUN A) and a first snapshot SNAP1 instance can be created for LUN B (Snap1 LUN B), where SNAP1 LUNB includes all writes directed to LUN B received prior to T1, and where SNAP1 LUN A includes all writes directed to LUN A received prior to T1. Additionally, a second snapshot SNAP2 instance can be created for LUN A (Snap2 LUN A) and a second snapshot SNAP2 instance can be created for LUN B (Snap2 LUN B), where SNAP2 LUNB includes all writes directed to LUN B received prior to T2, and where SNAP2 LUN A includes all writes directed to LUN A received prior to T2.

In this manner, writes recorded, such as in the log, between two successive checkpoints or points in time corresponding to requests or commands to create snapshots can denote the writes made to LUNs in a CG providing a transactionally consistent view across all LUNs of the CG. Thus in such an embodiment, all writes between the two successive checkpoints or points in time corresponding to snapshot requests can be applied atomically to the LUNs of the CG to provide a transactionally consistent view with respect to multiple writes of each single transaction.

In at least one embodiment, the source or R1 system 2102 can utilize the techniques of the present disclosure to create identical snapshots on the systems 2102 and 2104 during synchronous remote replication such as based on a configuration of FIG. 4 or FIG. 5. In at least one embodiment, the R2 system 2104 can create and use successive snapshots based on replicated write data received from the R1 system 2102. For example, writes made to the R1 device 2124 can be replicated from the R1 system 2102 to the R2 system 2104. The writes can generally be included in a logical stream denoting a time order in which the writes (made to the R1 device) are to be applied to the R2 device 2124. The logical stream can also include checkpoint command records each denoting a checkpoint in the stream such that replicated writes/replicated write data can be included between pairs of successive checkpoint records in the stream. The R2 system 2104 can create multiple single snapshots each including all replicated writes between a pair of two successive checkpoints in the stream where such replicated writes were made to the R1 device 2124 and are now to be applied to the R2 device 2126. More generally, the logical stream can include writes directed to multiple LUNs of a CG, where the logical stream can include more than two checkpoints thereby denoting writes incorporated by the R2 system 2104 into two or more snapshots. Generally, the writes between two successive checkpoint records such as in the logical stream sent to the R2 system can denote barriers which can be used, for example, to create snapshots on the R2 system, and more generally, to provide semantics for transactional write consistency (e.g., where the checkpoints can denote the bounds or barriers of a write transaction for which all writes between two successive checkpoints can be applied).

Described in the following paragraphs are the techniques of the present disclosure which provide for creating identical snapshots of two LUNs on two systems where the two LUNs can be configured as a device pair for synchronous replication. The synchronous replication can be one-way or bidirectional. Generally in at least one embodiment, the identical snapshots can be created during synchronous replication. Nearly identical snapshots of the two LUNs can be obtained. The two LUNs can be different physical volumes and can be configured as the same LUN, such as LUN A. A first of the two snapshots may be created at a point in time T1 that is prior to the time T2 when the second of the two snapshots may be created. The first snapshot can be modified to be identical to the second snapshot.

In at least one embodiment, the techniques of the present disclosure can rely on the ability to dynamically track changes in the one or more storage objects, such as one or more LUNs, configured for remote synchronous replication. When the foregoing capability is enabled for a set of LUNs or other set of storage objects such as of a CG, in at least one embodiments per storage object log or record can be maintained. The per storage object log or record can be maintained in volatile memory and can track the writes submitted against or directed to the storage object. For example, assume the storage object is a LUN, its associated log can track writes by tracking, for each write operation, the LBA to which the write is directed (e.g., LBA where the write data is stored) and the write size (e.g., size of the write payload data).

In at least one embodiment, for each storage object, a copy engine can be utilized For example, a copy engine for each LUN can be initialized on the primary or R1 system 2102. In at least one embodiment, the request to obtain identical snapshots of the R1 device 2124 and its remote counterpart R2 device 2126 can be initiated, controlled and driven by the R1 system 2102. The copy engine per LUN can be initialized on the primary system 2102 with a local source snapshot and a remote destination snapshot. The copy engine can be requested to perform a copy operation from the source snapshot to the destination snapshot. In at least one embodiment, the copy operation can utilize a bitmap where each bit can represent a single LBA or other unit of storage of the source LUN that has been changed or modified by a write included in the source snapshot. For each changed LBA as denoted by its corresponding bit in the bitmap, the corresponding changed data can be copied from the source snapshot to the destination snapshot.

Figure 6A:
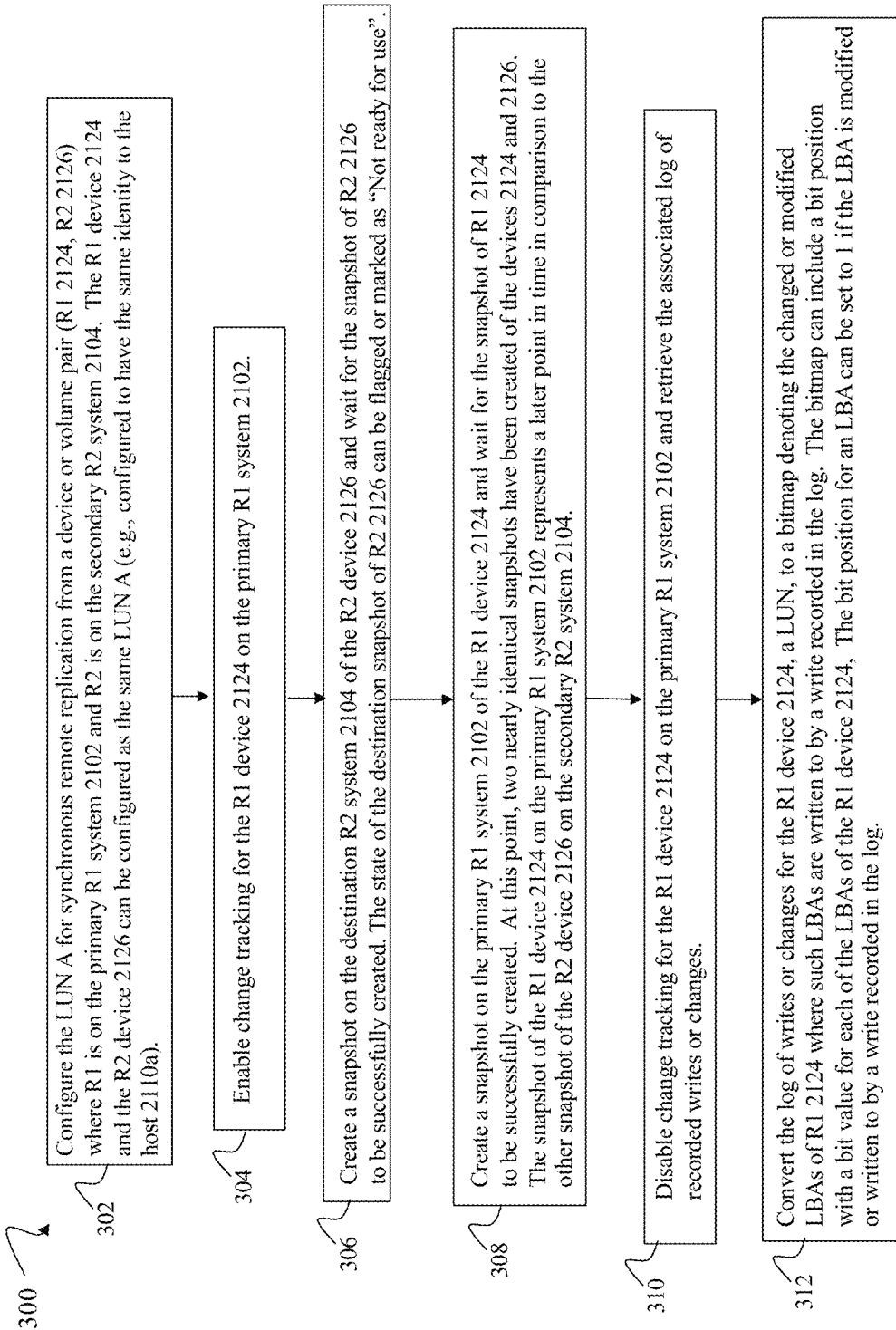

Referring to FIGS. 6A and 6B, shown are flowcharts 300, 350 of processing steps that can performed in at least one embodiment in accordance with the techniques of the present disclosure.

The steps of FIGS. 6A and 6B can be performed to obtain identical snapshots of a storage object and its remote counterpart. In the following description for simplicity of illustration, reference is made to only a single storage object configured for synchronous remote replication where the storage object is a LUN, such as LUN A described in connection with FIG. 4, configured from two volumes or devices, R1 2124 of the system 2102 and R2 2126 of the system 2104. More generally, the techniques can be performed with respect to any suitable storage object or group of storage objects such as, for example, for a CG of multiple LUNs. Additionally, the same workflow of processing steps as illustrated in FIGS. 6A and 6B can be performed for one or more storage objects configured for bidirectional synchronous remote replication such as illustrated, for example, in connection with FIG. 5. For example, the techniques of the present disclosure can be performed for a LUN, such as LUN A described in connection with FIG. 5, configured from two volumes or devices, R1 2124 of the system 2102 and R2 2126 of the system 2104, where the two volumes or devices 2124, 2126 are further configured for bidirectional synchronous remote replication.

With reference to FIGS. 6A and 6B, at the step 302, processing can be performed to configure the LUN A for synchronous remote replication from a device or volume pair (R1 2124, R2 2126), where R1 is on the primary R1 system 2102 and R2 is on the secondary R2 system 2104. The R1 device 2124 and the R2 device 2126 can be configured as the same LUN A (e.g., configured to have the same identity to the host 2110a). In at least one embodiment, the LUN A configured in the step 302 can be configured for one-way synchronous remote replication such as described in connection with FIG. 4. Alternatively, the LUN A configured in the step 302 can be configured for bi-directional (two way) synchronous remote replication such as described in connection with FIG. 5.

In the embodiment in which the LUN A is configured for one-way synchronous replication as in FIG. 4 where data is replicated from the R1 device 2124 to the R2 device 2126, writes from the host directed to the LUN A can now be received at the system 2102, applied to the R2 device 2124 and then synchronously replicated to the system 2104. The foregoing where the host issues writes and the writes are synchronously replicated can be performed in an ongoing continuous manner while the remainder of the steps of FIGS. 6A and 6B are performed.

In the embodiment in which the LUN A is configured for bi-directional synchronous replication as in FIG. 5 where data is replicated from the R1 device 2124 to the R2 device 2126, and also from the R2 device 2126 to the R1 device 2124, writes from the host directed to the LUN A can now be received at the R1 system 2102, applied to the R1 device 2124 and then synchronously replicated to the R2 system 2104 for storing on the R2 device 2126. Additionally, writes from the host directed to the LUN A can now be received at the R2 system 2104, applied to the R2 device 2126 and then synchronously replicated to the R1 system 2102 for storing on the R1 device 2124. The foregoing where the host issues writes and the writes are synchronously replicated in a bidirectional manner as described above and in connection with FIG. 5 can be performed in an ongoing continuous manner while the remainder of the steps of FIGS. 6A and 6B are performed.

From the step 302, control proceeds to the step 304. At the step 304, processing can be performed to enable change tracking for the R1 device on the primary R1 system 2102. From the step 304, control proceeds to the step 306.

At the step 306, processing can be performed to create a snapshot on the destination R2 system 2104 of the R2 device 2126 and wait for the snapshot of R2 2126 to be successfully created. The state of the destination snapshot of R2 2126 can be flagged or marked as "Not ready for use". From the step 306, control proceeds to the step 308.

At the step 308, processing can be performed to create a snapshot on the primary R1 system 2102 of the R1 device 2124 and wait for the snapshot of R1 2124 to be successfully created. At this point, two nearly identical snapshots have been created of the devices 2124 and 2126. The snapshot of the R1 device 2124 on the primary R1 system 2102 represents a later point in time in comparison to the other snapshot of the R2 device 2126 on the secondary R2 system 2104. From the step 308, control proceeds to the step 310.

At the step 310, processing can be performed to disable change tracking for the R1 device 2124 on the primary R1 system 2102 and retrieve the associated log of recorded writes or changes. The log can include the recorded writes or changes made to the R1 device 2124 during the time interval or window of time beginning at the time P1 with the step 304 (when change tracking is enabled) and ending at the time P2 at the step 310 when change tracking is disabled.

It should be noted that if the desired application data set configured for synchronous remote replication in the step 302 for which the techniques of the present disclosure are performed includes multiple LUNs such as included in the same CG or more generally multiple storage objects, the step 304 enables change tracking for each such LUN so that change tracking can be recorded per LUN or volume as noted above. Additionally the step 310 disables change tracking for all such multiple LUNs or storage objects.

From the step 310, control proceeds to the step 312. At the step 312, processing can be performed to convert the log of writes or changes for the R1 device 2124, a LUN, to a bitmap denoting the changed or modified LBAs of R1 device 2124 where such LBAs are written to by a write recorded in the log. The bitmap can include a bit position with a bit value for each of the LBAs of the R1 device 2124, The bit position for an LBA can be set to 1 if the LBA is modified or written to by a write recorded in the log. From the step 312, control proceeds to the step 314.

At the step 314, processing can be performed to map the snapshot of R2 2126 on the secondary R2 system as a "target" of a copy operation to be performed from the primary R1 system 2102 so that the snapshot of R2 2126 can be overwritten by the copy operation performed by the primary R1 system 2102. From the step 314, control proceeds to the step 316.

At the step 316, processing can be performed to initiate a copy operation such as by a copy engine on the primary R1 system 2102, where the mapped snapshot of R2 2126 (snapshot of R2 2126 taken in the step 306) is the target or destination of the copy operation, and where the local snapshot of R1 2124 (snapshot of R1 214 taken in the step 308) is the source of the copy operation. From the step 316, control proceeds to the step 318.

At the step 318, processing can be performed to issue a copy command using the copy engine and the bitmap denoting the changed blocks of data or content to be copied. The step 318 can include copying the changed content or blocks of data as denoted by the bit values=1 of the bitmap from the copy source (the snapshot of R1 2124) to the copy destination (the snapshot of R2 2126).

It should be noted that if the desired application data set configured for synchronous remote replication in the step 302 for which the techniques of the present disclosure are performed include multiple LUNs such as included in the same CG or more generally multiple storage objects, the steps 312, 314, 316 and 318 can be repeated and performed for each one of the multiple LUNs or storage objects. In at least one embodiment where the processing is performed for multiple LUNs such as of a CG, the steps 312, 314, 316 and 318 for a first LUN of the CG can be performed concurrently when performing the steps 312, 314, 316 and 318 for a second different LUN of the CG. In this manner, for example, for a CG with N LUNs, N concurrent or parallel processing streams of the steps 312, 314 316 and 318 can be performed for each of the N LUNs.

From the step 318, control proceeds to the step 320 where the log of changes for the LUN A (or more generally for the one or more storage objects) can be discarded. From the step 320, control proceeds to the step 322.

At the step 322, at this point, the two snapshots—the snapshot of R1 2124 and the snapshot R2 2126 are identical and contain the same content or data. Step 322 can include performing processing that updates the timestamp of the destination snapshot of R2 2126 to match the timestamp of the source snapshot of R1 2124. Additionally in the step 322, any attributes that uniquely identify the foregoing source and destination snapshots as being the same can also be updated such as for the destination snapshot R2 2126. The state of the destination snapshot of R2 2126 can be flagged or marked as "ready for use".

It should be noted that if the desired application data set configured for synchronous remote replication in the step 302 for which the techniques of the present disclosure are performed include multiple LUNs such as included in the same CG or more generally multiple storage objects, the step2 320 and 322 can be performed for each one of the multiple LUNs or storage objects.

In connection with the foregoing of FIGS. 6A and 6B, given that processing first takes a snapshot of the R2 device 2126 on the secondary R2 system 2104 (in the step 306) and then subsequently takes a snapshot of the R1 device 2124 on the primary R1 system 2102 (in the step 308), it can be expected that more writes would have accumulated and been applied to the snapshot of R1 2124 on the primary R1 system 2102 than the snapshot of R2 2126 on the R2 system 2104. Put another way, the snapshot of R1 2124 is taken at a later point in time than the snapshot of R2 2126. Thus it can be expected that the snapshot of R1 2124 is taken at the later point in time has more writes or modifications than the snapshot of R2 2126. These additional writes made to R1 2124 and its snapshot can be captured and recorded in the log by the change tracking enabled for R1 2124 in the step 304. The change tracking for R1 2124 and the subsequent copy operation applying the tracked writes or changes made to R2 2126 ensures that the additional writes made to R1 2124 and thus the snapshot of R1 2124 are resynchronized with the snapshot of R2 2126 on the secondary system 2104.

In a configuration such as illustrated in FIG. 5 where the R1 device 2124 and the R2 device 2126 are configured for bi-directional synchronous remote replication, the writes or changed tracked in the log for R1 2124 can collectively include: 1) the writes directed to LUN A (e.g., R1 2124) received directly from the host 2110a at the R1 system 2102, and also 2) the writes received via synchronous replication from the R2 system 2104. The writes of 2) can be characterized as writes from the host 2110a, where such writes are: received at the R2 system 2104, directed to the LUN A (e.g., R2 2126), and then replicated to the R1 system for application to R1 2124, and where such replicated writes are included in the log of changes or writes to R1 2124 and thus the writes included in the snapshot of R1 2124.

The foregoing approach as described in connection with the embodiments of FIGS. 6A and 6B does not require any locking mechanism across the two systems 2102, 2104 thereby avoiding any associated locking related latency impact. Any writes directed to the LUN A/R1 2124 that are received at the R1 system 2102 between the time the change log is enabled and later disabled can be sent twice to the R2 system 2104 due to the synchronous replication (from R1 2124 to R2 2126) and also due to the copy operation (which copies the changed or written data and applies the changed or written data to the snapshot of R2 2126). To further illustrate assuming that change tracking is enabled, a write directed to LUN A, R1 2124 can be received at the R1 system 2102 where the write can be recorded in the log. The write can be written a first time to R2 2126 as part of synchronous replication and then the same write can be written or applied to the snapshot of R2 2126 as part of the copy operation (where the logged changes or writes are copied to the destination or the snapshot R2 2126). In at least one embodiment, the second or latter data copy may not expected to be impactful to the system performance for one or more of the following reasons: (a) the time window for tracking changes dynamically is small (e.g., can be measured in seconds), (b) the two systems 2102 and 2104 can be connected by a low latency, high throughput network to satisfy the ongoing replication needs, and (c) the copy operation can be performed as a background copy so that a sudden increase in overall latency or increase in system workload can result slowing down the background copy to allow the data storage system to better serve host I/O.

Figure 7A:
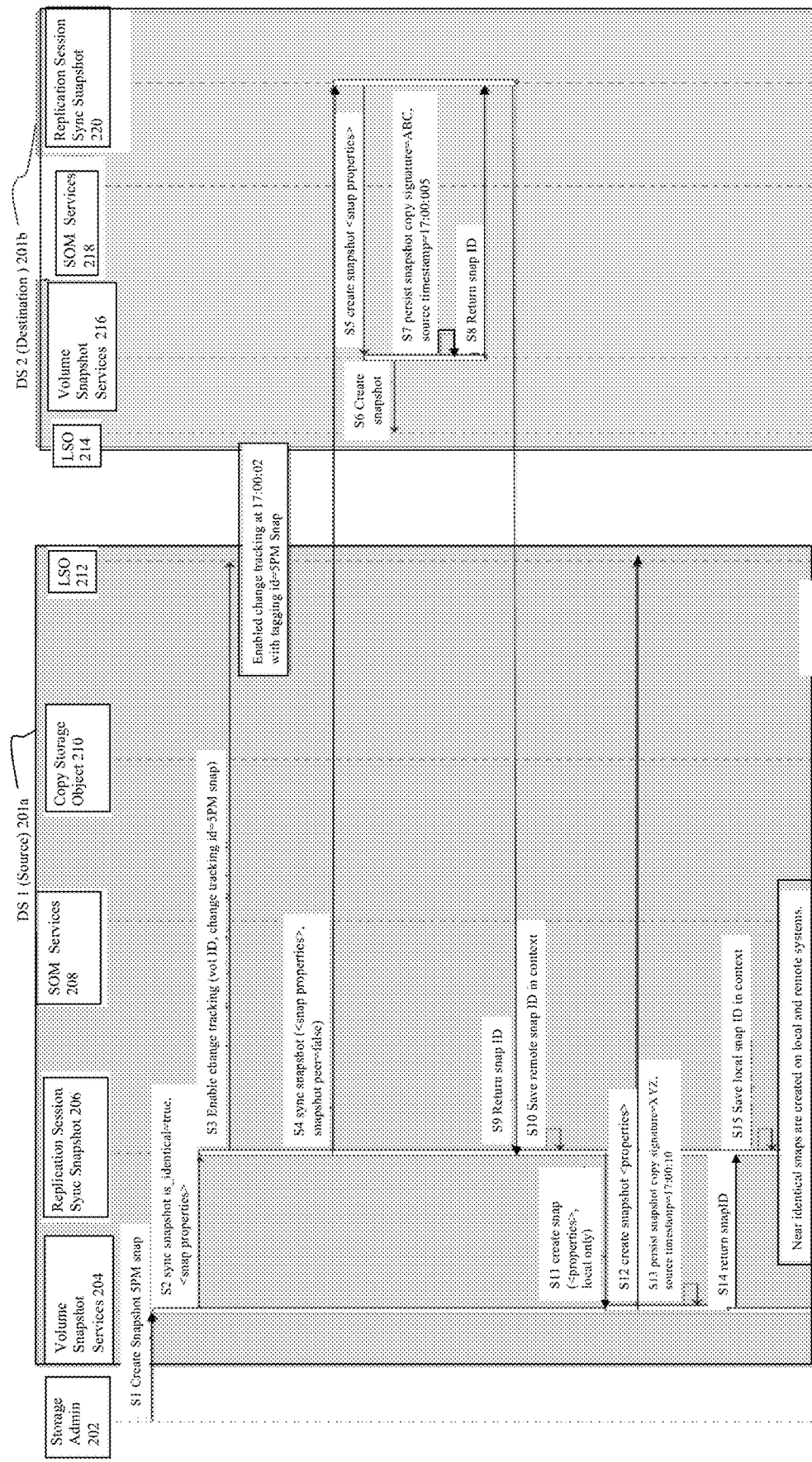
FIGS. 7A and 7B are a sequence diagram providing further detail or processing steps that can be performed in at least one embodiment in accordance with the techniques of the present disclosure.
Figure 7B:
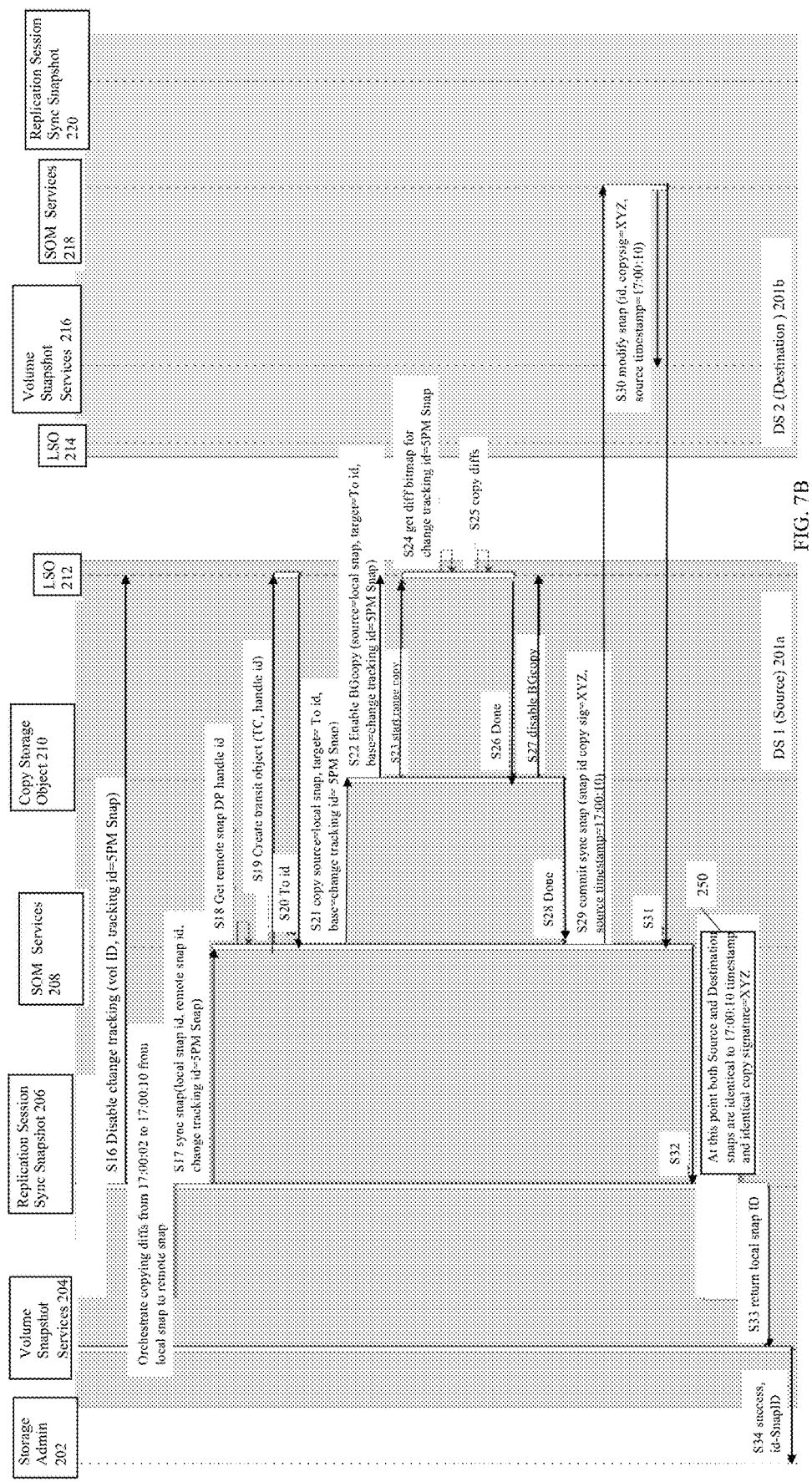

Referring to FIGS. 7A and 7B, shown is a sequence diagram illustrating in more detail processing that can be performed in at least one embodiment in accordance with the techniques of the present disclosure. FIGS. 7A and 7B can be described below with respect to a storage object that is a single LUN, such as LUN A discussed above, configured from the volume or device pair R1 2124 and R2 2126 which are further configured for synchronous remote replication as in FIG. 4 or bidirectional synchronous remote replication as in FIG. 5. It is straightforward to apply the processing described in connection with FIGS. 7A and 7B to multiple storage objects or LUNs such as a CG of multiple LUNs.

The FIGS. 7A and 7B illustrate processing and interaction between a storage administrator 202, components of a source system 201a and a destination system 201b. The source system 201a can be the primary R1 system 2102 which controls or drives processing to create the identical snapshots of the R1 2124 and R2 2126. The source system 201a can be the R1 system 2102 which includes a snapshot of R1 2124 used as the source of the copy operation. The destination system 201b can be the R2 system 2104 which includes the snapshot of R2 2126 used as the destination of the copy operation.

The source system 201a can include the following components: volume snap services 204, replication session sync (synchronize) snapshot 206, SOM (storage object mobility) services 208, copy storage object 210 and layered services orchestrator 212. The destination system 201b can include the following components: LSO 214, volume snapshot services 216, SOM services, 218 and replication session sync snapshot 220.

At the step S1, a request to create a snapshot can be made, for example, by a storage administrator 202. The request can be received at the source system 201a by the volume snapshot services 204. In this example where the system 201a is the R1 system 2102 and where the system 201b is the R2 system 2104, the request can be a request to create identical snapshots of R1 2124 of the system 2102 and R2 2126 of the system 2104. It should be noted generally the identical snapshots created can be any type of snapshot such as a replication related internal snapshot not exposed to a user, as well as a snapshot that can be exposed to the user such as, for example, in response to a user request to the create the snapshot.

Following S1 is a step S2 where the volume snapshot services 204 can be issuing a request of S2 to the replication session sync snapshot component 206 to create the pair of identical snapshots of R1 2124 and R2 2126. Following the step S2 is a step S3 where the replication session sync snapshot component 206 can issue the request of S3 to the LSO 212 to enable change tracking for R1 2124.

Following the step S3 is a step S4 where the replication session synch snapshot component 206 of the source system 201a can issue a request of S4 to the replication session synch snapshot component 220 of the destination system 201b to create the snapshot of R2 2126. The steps S5-S8 illustrate interactions and processing that can be performed by components of the destination system 201b. In the step S5, a request of S5 can be issued from the replication session synch snapshot component 220 to the volume snapshot services 216 to create the snapshot of R2 2126. In response, the step S6 can be performed to issue a request to create the snapshot from the component 216 to the LSO 214. Following the step S6 is a step S7 where the component 216 stores the snapshot copy signature of "ABC" along with its associated timestamp of 17:00:005. In at least one embodiment, the signature "ABC" can be used to uniquely identify a snapshot. Following the step S7 is a step S8 where the snap ID (identifier) for the snapshot of R2 2126 just created is returned (S9) to the source system 201a and then saved (S10) on the source system 201a.

Following the step S10 is a step S11 where the request of S11 is issued from the component 206 to the component 204 to create the second snapshot which is a local snapshot of R1 2124. Following the step S11, the step S12 issues a request to create the second snapshot from the component 204 to the LSO 212. Following the step S12 is the step S13 where the component 204 stores, for the second snapshot of R1 2124, its associated signature of "XYZ" and timestamp of 17:00:10. Following the step S13 is the step S14 where the snap ID for the second (local) snapshot of R1 2124 can be returned from the component 204 to the component 206. Following the step S14 is the step S15 where the component 206 can store the local snap ID of the second snapshot of R1 2124. Thus, the steps S11-S14 create the local snapshot of R1 2124.

At this point after completing the steps S1-S15, the two snapshots of R1 2124 and R2 2126 have been created where such snapshots can be characterized in one aspects as nearly identical.

Following the step D15 is the step S16 where the component 206 issues a request to the LSO 212 to disable change tracking for R1 2124. In this example, the change tracking for R1 2124 enabled in the step S3 enabled change tracking for R1 2124 beginning at the time 17:00:02 until the ending time 17:00:10. In this example, the ending time of 17:00:10 corresponds to the time when the change tracking is disabled in the step S16.

Following the step S16 is the step S17 where a request is issued from the component 206 to the component 208 to synchronize the local and remote snapshots of R1 2124 and R2 2126. In the step S18, the component 208 obtains the handle for the remote snap of R2 2126, and issues the request in the step S19 to the LSO 212 to create a transit object from the remote snap of R2 2126. In the step S20, the LSO 212 returns the ID to the transit object to the component 208.

The steps S21-S28 outline the copy workflow to copy the tracked changes or writes of R1 2124 to remote snapshot of R2 2126. In the step S21, the component 208 issues a copy request to the component 210. The component 210 then performs the step S22 to enable a background copy operation, and the step S23 to request that the LSO 212 copy the tracked changes. In the step S24, the LSO 212 obtains or generates a bitmap denoting the tracked or logged changes made to R1 2124 during the time interval or window noted above from when tracking was enabled to when tracking was disabled. In the step S25, the LSO 212 copies the changes data blocks as denoted by the bitmap to the remote snapshot of R2 2126. Following the step S25, control is returned from the LSO 212 to the component 210 which disables the background copy operation (S27) and then returns (S28) to the component 208.

Following the step S28 is the step S29 where the component 208 issues a request to the component 218 of the destination system 201b to update the information of the remote snapshot of R2 2126 to match information of the local identical snapshot of R1 2124. In the step S30, the component 218 issues the request of S30 to the component 216 on the destination system 201b to update or modify the snapshot signature and timestamp of the remote snapshot of R2 2126 to match those of the local snapshot of R1 2124. More generally, the signature and the timestamp can be examples of attributes of the remote snapshot of R2 2126 which are updated to match the those of the local snapshot of R1 2124.

Following the step S30, control is returned in the step S31 from the component 218 of the destination system 201b to the component 208 of the source system 201a. Control is then returned in the step S32 from the component 208 to 206. Control is then further returned (S33) from the component 206 to 204, and returned (S34) from the component 204 to the storage administrator 202.

As denoted by the element 250 of FIG. 7B, after the processing of the sequence diagram of FIGS. 7A and 7B has completed, both the source snapshot of R1 2124 and the destination snapshot of R2 2126 are identical and contain the same content or data corresponding to the timestamp of 17:00:10 and have the same signature of "XYZ".

It should be noted that the identical snapshots of storage objects obtained by performing the techniques of the present disclosure can be used for any suitable purpose or application. For example with reference to FIGS. 4 and 5, the identical snapshots can include a snapshot S1 of the R1 device 2124 and a snapshot S2 of the R2 device 2126. S1 and S2 can thus denote two identical snapshots obtained by performing processing as described, for example, in FIGS. 6A-6B, or in FIGS. 7A-7B. S1 or S2 can denote identical common base snapshots which can be further used in one or more other applications or scenarios. For example, S1 and S2 can be used for further asynchronous replication to a third system or site. In this manner, the replication topology can include the systems 2102, 2104 as well as a third system.

For example, reference is made to FIG. 8 of an example configuration 400. The example 400 includes the following data storage systems: Data storage system (DS) 1 402a, DS2, 402b, DS3 402c; and includes the following LUNs or volumes: V1 404a, V2 404b and V3 404c. As discussed above, the volumes or LUNs 404a-c can be configured to have the same identity and thus represent the same logical device to a host (not illustrated). In at least one embodiment, the volume 404a of the system 402a can be configured for bidirectional synchronous replication with the volume 404b of the system 402b, for example, as discussed above in connection with FIG. 5. Additionally, the volume 404b of the system 402b can be configured for asynchronous replication to the volume 404c of the system 402c. In at least one embodiment, the techniques of the present disclosure such as described in connection with FIGS. 6A-6B and 7A-7B can be performed to obtain identical snapshots S1*l* and S12, respectively, of the volumes 404a and 404b. In the configuration of the example 400, the snapshot S12 of the volume 404b can then be used in connection with performing asynchronous replication of writes of the volume 404b to the volume 404c.

In at least one embodiment as discussed generally elsewhere herein, asynchronous replication can be performed using the snapshot-based mechanism wherein internal snapshots are periodically created on the source system 402b, changes between the current and previous snapshot are identified, and only those changes are provided to the replica remote storage object 404c on the system 402c. Consistent with other discussion herein in at least one such embodiment, asynchronous remote replication can be performed by a remote replication facility executing on the source system 402b where the remote replication facility can use a technique referred to as a snapshot difference or snap diff technique when performing asynchronous remote replication. The snap diff technique provides for taking two successive snapshots of the logical device or other storage object on the source system that is replicated on the target system, and then determining the data difference with respect to the two successive snapshots. The data difference denotes the data blocks that have been written or modified in the time interval from a first point in time to a second later point in time, where a first snapshot is taken at the first point in time and a second successive snapshot is taken at the second point in time. The time interval may correspond, for example, to a recovery point objective (RPO) defined as the maximum amount of allowable data loss, as measured by time, that can be lost after a recovery from a disaster, failure, or comparable event before data loss will exceed what is acceptable to an organization. The snap diff technique can provide for taking a snapshot at each RPO interval. For example, for an RPO of 5 hours, a snapshot of the logical device can be taken on the source system every 5 hours and compared to the immediately prior snapshot to determine the data differences including data blocks that have been modified since the immediately prior snapshot. The data differences including the modified or newly written data blocks of the logical device are then transferred from the source system to the target system and applied to the remote copy of the logical device on the target or remote system.

It should be noted that the foregoing configuration of FIG. 8 is only one non-limiting example of a scenario in which one of the identical snapshots obtained using the techniques of the present disclosure can be further utilized. Additionally, the identical snapshot can be further used in connection with other topologies than as illustrated in FIG. 8. For example, the systems 402a-b can be configured for one-way synchronous replication from the volume 404a of the system 402a to the volume 404b of the system 402b as in FIG. 4 rather than for bidirectional synchronous replication as in FIG. 5.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method for creating identical snapshots comprising:
    performing synchronous replication between a first storage object of a first system and a second storage object of a second system, wherein said synchronous replication includes replicating writes, which are directed to the first storage object and which are received at the first system, from the first system to the second system for application to the second storage object of the second system;
    enabling change tracking for the first storage object of the first system, wherein said change tracking, while enabled for the first storage object, records in a log which portions of the first storage object are written or modified;
    responsive to said enabling, creating a first snapshot of the second storage object of the second system;
    responsive to said creating the first snapshot of the second storage object of the second system, creating a second snapshot of the first storage object of the first system;
    responsive to said creating the first snapshot of the first storage object of the first system, disabling said change tracking for the first storage object of the first system;
    identifying, using the log, particular blocks of the first storage object that have been modified between said enabling and said disabling;
    mapping the first snapshot of the second storage object on the second system as a target of a copy operation so that the first snapshot of the second storage object on the second system is allowed to be overwritten by the copy operation;
    initiating, by the first system, the copy operation configured to have a source of the copy operation and the target of the copy operation, wherein the source is the second snapshot of the first storage object of the first system, and wherein the target is the first snapshot of the second storage object on the second system; and
    performing the copy operation including copying written or modified content of the particular blocks of the first storage object as identified using the log from the source, that is configured as the second snapshot of the first storage object of the first system, to the target, that is configured as the first snapshot of the second storage object of the second system.

2. The computer-implemented method of claim 1, further comprising:
    updating one or more attributes of the first snapshot of the second storage object to match one or more corresponding attributes of the second snapshot of the first storage object.

3. The computer-implemented method of claim 2, wherein the one or more attributes include a timestamp and said updating includes updating the timestamp of the first snapshot of the second storage object to match a corresponding timestamp of the second snapshot of the first storage object.

4. The computer-implemented method of claim 2, wherein the one or more attributes include a snapshot signature and said updating includes updating the snapshot signature of the first snapshot of the second storage object to match a corresponding snapshot signature of the second snapshot of the first storage object.

5. The computer-implemented method of claim 1, wherein each of the first storage object and the second storage object is a logical device or a volume.

6. The computer-implemented method of claim 1, wherein each of the first object and the second object is a consistency group of a plurality of logical devices or volumes.

7. The computer-implemented method of claim 1, wherein each of the first storage object and the second storage object includes one or more file-based entities.

8. The computer-implemented method of claim 7, wherein the one or more file-based entities include any of a file system and a file.

9. The computer-implemented method of claim 1, wherein the first storage object and the second storage object are configured for one-way synchronous remote replication where writes to the first storage object of the first system are automatically replicated to the second storage object of the second system.

10. The computer-implemented method of claim 1, wherein the first storage object and the second storage object are configured for bi-directional synchronous remote replication where writes to the first storage object of the first system are automatically replicated to the second storage object of the second system, and where writes to the second storage object of the second system are automatically replicated to the first storage object of the first system.

11. The computer-implemented method of claim 10, wherein the first storage object and the second storage object are configured as a same storage object each having a same identity so that a host connected to the first system and the second system views the first storage object and the second storage object as the same storage object having the same identity.

12. The computer-implemented method of claim 11, wherein the host is connected to the first system over a first connection and the host is connected to the second system over a second connection, and wherein the host issues first writes directed to the same storage object over the first connection and wherein the host issues second writes directed to the same storage object over the second connection.

13. The computer-implemented method of claim 12, wherein the first storage object is a first volume and the second storage object is a second volume, and wherein the first volume and the second volume are configured as a same logical device, and wherein the computer-implemented method further comprises:
receiving, at the first system, the first writes directed to first logical addresses of the same logical device;
storing the first data at the first logical addresses of the first volume configured as the same logical device on the first system;
replicating the first data from the first system to the second system; and
storing the first data at the first logical addresses of the second volume configured as the same logical device on the second system.

14. The computer-implemented method of claim 13, further comprising:
receiving, at the second system, the second writes to second logical address of the same logical device;
storing the second data at the second logical addresses of the second volume configured as the same logical device on the second system;
replicating the second data from the second system to the first system; and
storing the second data at the second logical addresses of the first volume configured as the same logical device on the first system.

15. The computer-implemented method of claim 14, further comprising:
creating a bitmap in accordance with the log of changes made to the first volume, wherein the bitmap includes a bit position corresponding to each logical block address of the first volume, wherein the bit position for a corresponding logical block address is 1 if the log indicates the corresponding logical block address includes content which has been written or modified, and wherein the bit position for the corresponding logical block address otherwise is 0.

16. The computer-implemented method of claim 15, wherein said copying uses the bitmap to identify logical block addresses of the first volume containing written or modified content which is to be copied by said copying to the first snapshot of the second storage object of the second system.

17. A system comprising:
one or more processors; and
a memory comprising code stored thereon that, when executed, performs a method for creating identical snapshots comprising:
performing synchronous replication between a first storage object of a first system and a second storage object of a second system, wherein said synchronous replication includes replicating writes, which are directed to the first storage object and which are received at the first system, from the first system to the second system for application to the second storage object of the second system;
enabling change tracking for the first storage object of the first system, wherein said change tracking, while enabled for the first storage object, records in a log which portions of the first storage object are written or modified;
responsive to said enabling, creating a first snapshot of the second storage object of the second system;
responsive to said creating the first snapshot of the second storage object of the second system, creating a second snapshot of the first storage object of the first system;
responsive to said creating the first snapshot of the first storage object of the first system, disabling said change tracking for the first storage object of the first system;
identifying, using the log, particular blocks of the first storage object that have been modified between said enabling and said disabling;
mapping the first snapshot of the second storage object on the second system as a target of a copy operation so that the first snapshot of the second storage object on the second system is allowed to be overwritten by the copy operation;
initiating, by the first system, the copy operation configured to have a source of the copy operation and the target of the copy operation, wherein the source is the second snapshot of the first storage object of the first system, and wherein the target is the first snapshot of the second storage object on the second system; and
performing the copy operation including copying written or modified content of the particular blocks of the first storage object as identified using the log from the source, that is configured as the second snapshot of the first storage object of the first system, to the target, that is configured as the first snapshot of the second storage object of the second system.

18. A non-transitory computer readable medium comprising code stored thereon that, when executed, performs a method for creating identical snapshots comprising:
performing synchronous replication between a first storage object of a first system and a second storage object of a second system, wherein said synchronous replication includes replicating writes, which are directed to the first storage object and which are received at the first system, from the first system to the second system for application to the second storage object of the second system;
enabling change tracking for the first storage object of the first system, wherein said change tracking, while enabled for the first storage object, records in a log which portions of the first storage object are written or modified;
responsive to said enabling, creating a first snapshot of the second storage object of the second system;
responsive to said creating the first snapshot of the second storage object of the second system, creating a second snapshot of the first storage object of the first system;
responsive to said creating the first snapshot of the first storage object of the first system, disabling said change tracking for the first storage object of the first system;
identifying, using the log, particular blocks of the first storage object that have been modified between said enabling and said disabling;
mapping the first snapshot of the second storage object on the second system as a target of a copy operation so that the first snapshot of the second storage object on the second system is allowed to be overwritten by the copy operation;
initiating, by the first system, the copy operation configured to have a source of the copy operation and the target of the copy operation, wherein the source is the second snapshot of the first storage object of the first system, and wherein the target is the first snapshot of the second storage object on the second system; and
performing the copy operation including copying written or modified content of the particular blocks of the first storage object as identified using the log from the source, that is configured as the second snapshot of the first storage object of the first system, to the target, that is configured as the first snapshot of the second storage object of the second system.

* * * * *